US012345081B2

(12) United States Patent
Lee

(10) Patent No.: US 12,345,081 B2
(45) Date of Patent: Jul. 1, 2025

(54) LOWER BRACKET AND ANCHOR SYSTEM FOR A MOVABLE BARRIER

(71) Applicant: OVERHEAD DOOR CORPORATION, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 337 days.

(21) Appl. No.: 17/885,885

(22) Filed: Aug. 11, 2022

(65) Prior Publication Data

US 2024/0052680 A1 Feb. 15, 2024

(51) Int. Cl.
*E05D 15/16* (2006.01)
*E05D 15/22* (2006.01)

(52) U.S. Cl.
CPC ............ *E05D 15/165* (2013.01); *E05D 15/22* (2013.01); *E05Y 2201/684* (2013.01); *E05Y 2201/688* (2013.01)

(58) Field of Classification Search
CPC ......... E05Y 2201/684; E05Y 2201/688; E05Y 2201/664; E05Y 2201/654; E05Y 2201/658; E05F 15/681; E05F 15/686; E05D 15/165; E05D 15/22; E05D 2015/225
See application file for complete search history.

(56) References Cited

U.S. PATENT DOCUMENTS

| | | | | | |
|---|---|---|---|---|---|
| 1,747,206 | A * | 2/1930 | Wilson | E05D 15/248 | 16/DIG. 31 |
| 2,442,309 | A * | 5/1948 | Norberg | E05D 15/24 | 160/193 |
| 2,567,763 | A * | 9/1951 | Clark | E05D 15/165 | 16/97 |
| 2,855,162 | A * | 10/1958 | Schacht, Jr. | E05D 13/1261 | 254/DIG. 14 |
| 3,354,934 | A * | 11/1967 | Stansberry | E05D 15/165 | 160/209 |
| 5,404,927 | A * | 4/1995 | Bailey | E05D 13/12 | 16/97 |
| 6,082,430 | A * | 7/2000 | Mock | E05D 15/24 | 49/200 |
| 6,112,464 | A * | 9/2000 | Grisham | E05D 13/1261 | 160/199 |
| 6,145,570 | A * | 11/2000 | Mullet | E05D 13/1261 | 160/201 |

(Continued)

OTHER PUBLICATIONS

Amarr, Installation Instructions, Commercial Sectional Doors, Form #161 Rev. 12/20, pp. 1-46.

(Continued)

*Primary Examiner* — Johnnie A. Shablack
(74) *Attorney, Agent, or Firm* — Haynes and Boone, LLP

(57) ABSTRACT

A bracket for securing a lift cable of a movable barrier is provided. The bracket may include a first wall including a first hole and a second wall spaced from the first wall to receive the lift cable therebetween. The second wall may include a second hole and the first hole and the second hole may be aligned and configured to receive a fastener couplable to the cable. The bracket may also include a third wall perpendicular to the first wall. The bracket may be shaped to fit within a rail of the movable barrier.

20 Claims, 21 Drawing Sheets

(56) References Cited

U.S. PATENT DOCUMENTS

| | | | | |
|---|---|---|---|---|
| 6,263,948 | B1 * | 7/2001 | Whitley | E05D 15/165 160/193 |
| 6,401,793 | B1 * | 6/2002 | Martin | E05D 15/246 49/200 |
| 6,588,482 | B2 * | 7/2003 | Wright | E05D 13/10 160/193 |
| 6,742,564 | B2 * | 6/2004 | Martin | E05D 15/246 160/188 |
| 8,720,112 | B2 * | 5/2014 | Eungard | E05F 15/686 49/200 |
| 12,012,803 | B2 * | 6/2024 | Patock | E06B 3/88 |
| 2007/0253798 | A1 | 11/2007 | Aquilina | |
| 2007/0289217 | A1 * | 12/2007 | Gall | E05D 13/12 49/323 |
| 2009/0288344 | A1 * | 11/2009 | Schram | H04L 5/005 49/507 |
| 2012/0234507 | A1 * | 9/2012 | Rauch | E05D 13/1292 29/426.1 |
| 2023/0003065 | A1 * | 1/2023 | Roesner | E06B 3/485 |
| 2024/0052680 | A1 * | 2/2024 | Lee | E05F 15/686 |
| 2024/0052681 | A1 * | 2/2024 | Lee | E05F 15/686 |

OTHER PUBLICATIONS

C.H.I. Overhead Doors, Installation Instructions for Commercial Steel Garage Doors, 2002, pp. 1-40.
Garaga, Installation Manual, November 2021, pp. 1-24.
Horman, Installation Instructions & Owner's Manual, Hormann Sectional Garage Doors with Standard Track, H/ (Issue 05.18, print 05.18) May 2018, pp. 1-32.
Ideal Door, Commercial & Industrial Sectional Doors, Installation & Maintenance, 2019, 013007-R02-0219, pp. 1-28.
Northwest Door, Inc., Garage Door Installation Instructions, VS1.1 1-03-SL, 14 pages.
Wayne Dalton, Aluminum Full View Models 464, 451, 452, Torsion Commercial Standard Lift Installation Instructions and Owner's Manual, Rev12_Jan. 4, 2021, 26 pages.

* cited by examiner

LOWER BRACKET AND ANCHOR SYSTEM FOR A MOVABLE BARRIER

RELATED APPLICATION

The present disclosure is related to co-pending U.S. application Ser. No. 17/886,013, filed Aug. 11, 2022, titled ANCHOR SYSTEM FOR A BRACKET OF A MOVABLE BARRIER, incorporated herein by reference.

TECHNICAL FIELD

The present disclosure relates generally to the field of movable barriers. In some aspects the present disclosure relates to brackets and anchor systems for lift cables usable on moveable barriers.

BACKGROUND

Movable barriers, such as upward-acting sectional or single panel garage doors, residential and commercial rollup doors, and slidable and swingable gates, are used to alternatively allow and restrict entry to building structures and property. A commonly used movable barrier is an upward-acting slidable barrier. Typical upward-acting barriers may be raised by lift cables. On each side of a movable barrier, one end of a lift cable is attached to a lower portion. The other ends of the lift cables are secured to a cable drum. As a barrier operator turns the cables drums, the lift cables are wrapped around the cable drums and the movable barrier is raised along tracks on either side of the barrier.

For typical movable barriers, the lift cables are attached to the lower portions at either side by lower brackets. The lower brackets are secured to an inward-facing side of the movable barrier with fasteners, such as screws or bolts. In this way, the upward acting force provided by the lift cables in an upward direction are transferred to the movable barrier through the fasteners alone. Because the lower brackets are attached to the movable barrier by the fasteners only, the entire weight of the movable barrier is supported by the fasteners. Bearing this weight, the attachment of the lift cables to the movable barrier by the fasteners may be prone to failure. The attachment by the fasteners may be weakened over time due to repeated use, repeated removal and reinstallation of the fasteners for servicing or other reasons, or general wear and tear.

In addition, the lower brackets securing the movable barrier to lift cables on either side are typically unique to the side of the movable barrier. For example, a movable barrier installation may require a left lower bracket as well as a right lower bracket. Because the two lower brackets are not interchangeable, the number of necessary unique parts for assembly or servicing of typical movable barriers is increased, leading to increased manufacturing and inventory complexity and cost.

SUMMARY

In an example aspect, the present disclosure is directed to a bracket for securing a lift cable of a movable barrier. The bracket may include a first wall including a first hole; a second wall spaced from the first wall to receive the lift cable therebetween, the second wall including a second hole, the first hole and the second hole being aligned and configured to receive a fastener couplable to the cable; and a third wall perpendicular to the first wall; wherein the bracket is shaped to fit within a rail of the movable barrier.

In some aspects, the second wall is a flange protruding from the first wall. In some aspects, the first hole and the second hole are coaxially aligned. In some aspects, the bracket further includes a fastener configured to couple the third wall of the bracket to an inner surface of the cavity of the rail. In some aspects, the fastener is further configured to couple a roller tube to an outer surface of the rail. In some aspects, the bracket further comprises: a fourth wall including a fifth hole; and a fifth wall including a sixth hole, wherein the first cavity corresponds to a first end of the rail and when the bracket is positioned within the first cavity corresponding to the first end of the rail, the first hole and second hole are configured to receive the pin, and wherein the rail further comprises a second cavity corresponding to a second opposite end of the rail and when the bracket is positioned within the second cavity, the fifth hole and the sixth hole are configured to receive a second pin couplable to a cable. In some aspects, an upper profile of the first wall of the bracket and an upper profile of the fourth wall of the bracket aligns with a profile of the first cavity of the first end of the rail and the second cavity of the second end of the rail. In some aspects, a lower profile of the first wall of the bracket and a lower profile of the fourth wall of the bracket aligns with a profile of the first cavity of the first end of the rail and the second cavity of the second end of the rail. In some aspects, the bracket further includes a sixth wall perpendicular to the first wall and the fourth wall and being coupled to both the first wall and fourth wall. In some aspects, the bracket within the rail of the movable barrier is positioned within a cavity of the rail such that the bracket supports loads applied on the bracket in an upward direction.

In an example aspect, the present disclosure is directed to a movable barrier. The movable barrier may include a rail extending horizontally with respect to the movable barrier, the rail defining a first inner cavity at a first end of the rail and a second inner cavity at a second end of the rail; a bracket configured to be positioned within the first inner cavity of the rail or the second inner cavity, the bracket comprising: a first wall comprising a first hole; a first flange extending from the first wall of the bracket, the first flange comprising a second hole, wherein the first hole and the second hole are aligned and spaced by a separation; and a pin configured to span the separation and attach to a first cable.

In some aspects, the first inner cavity is defined at least by a first rear inner surface of the rail and a first front inner surface of the rail and the second inner cavity is defined at least by a second rear inner surface of the rail and a second front inner surface of the rail. In some aspects, wherein the bracket further comprises a second wall and a third wall such that: when the bracket is positioned within the first inner cavity, the second wall of the bracket contacts the first rear inner surface of the rail and the third wall of the bracket contacts the first front inner surface of the rail; and when the bracket is positioned within the second inner cavity, the second wall of the bracket contacts the second rear inner surface of the rail and the third wall of the bracket contacts the second front inner surface of the rail. In some aspects, when the bracket is positioned within the first inner cavity, the first hole and the second hole are configured to receive the first pin, and wherein, when the bracket is positioned the second inner cavity, the first hole and the second hold are configured to receive a second pin, the second pin couplable to a second cable attachable to the movable barrier. In some aspects, the bracket further comprises a third hole within the second wall, the third hole configured to receive a first fastener when the bracket is positioned within the first cavity of the rail and wherein the bracket further comprises a fourth hole within the third wall, the fourth hole configured to receive a second fastener when the bracket is positioned within the second cavity of the rail. In some aspects, the rail of the movable barrier extends along a lower portion of the barrier. In some aspects, the first end and the second end correspond to opposite sides of the movable barrier. In some aspects, the pin is oriented horizontally and parallel to the rail.

In an example aspect, the present disclosure is directed to a bracket for a movable barrier. The bracket may include a first wall including a first hole; a second wall including a second hole, the second wall positioned opposite the first wall; a third wall including a third hole, the third hole configured to receive a fastener; a first flange protruding from the first wall, the flange including a fourth hole, the first hole and the fourth hole configured to receive a first pin couplable to a first cable; and a second flange protruding from the second wall, the second flange including a fifth hole, the second hole and the fifth hole configured to receive a second pin couplable to a second cable.

In some aspects, the third hole is transverse to the first hole and the second hole.

In an example aspect, the present disclosure is directed to a bracket for securing a lift cable to a movable barrier having a bottom rail. The bracket may include a first wall sized to fit within an end opening of the bottom rail; a second wall extending transverse to the first wall and sized to substantially span the end opening of the bottom rail; and an anchor system attached to one of the first wall and the second wall and shaped to project from the end opening of the bottom rail when the first wall is within the end opening of the bottom rail, the anchor being attachable to the lift cable.

In some aspects, the first wall comprises holes usable to secure the first wall to the moveable barrier. In some aspects, the anchor system comprises a flange and a pin securable to the flange.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
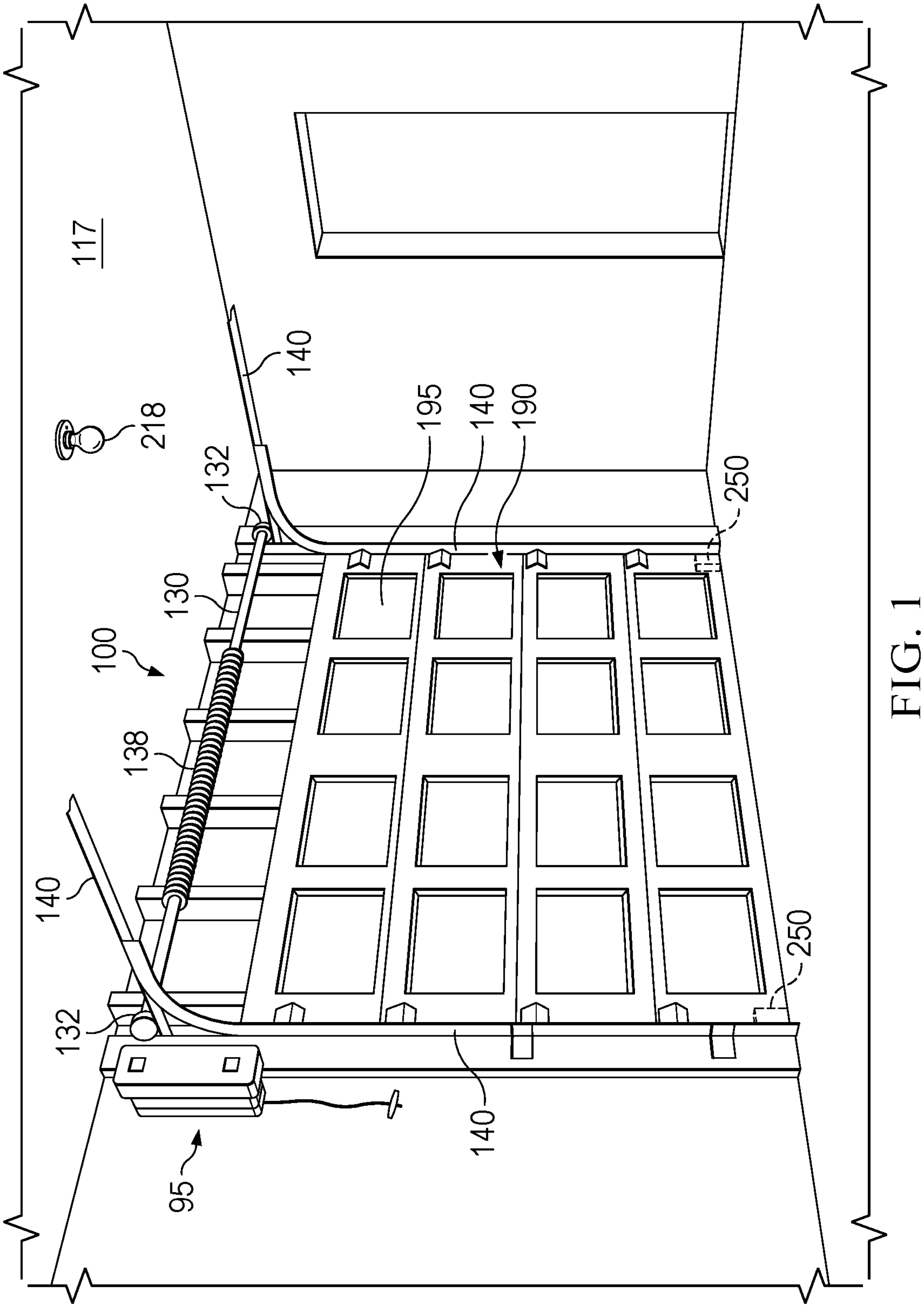
FIG. 1 is a perspective illustration of a movable barrier system, according to aspects of the present disclosure.

These Figures will be better understood by reference to the following detailed description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, the present disclosure relates to a lower bracket and an anchor system including a pin and a lock used to attach the lift cable of a movable barrier system to a movable barrier. The bottom rail of the movable barrier may includes two cavities at either end of the rail. Each of these cavities may be of a particular shape. The lower bracket may be sized and shaped with a profile matching the shape of the cavities of the rail. In this way, the lower bracket may be positioned within either of the cavities of the rail. The lift cable is attached to the bracket. For example, the lower bracket may include two flanges on either side of the bracket, top and bottom or either end of the bracket, left and right. Each flange may include a hole aligned with another hole of the wall of the lower bracket. Prior to installation of the lower bracket within the cavity of the rail, a loop of the lift cable is placed between one of the flanges of the lower bracket and the wall of the bracket. A pin is then placed through the hole of the flange, the loop of the lift cable, and the hole of the wall. A lock is placed through an opening of the lower bracket and engages with the pin, securing it in place. In this configuration, the lower bracket is placed within one of the cavities of the rail. Because the lower bracket is placed within the cavity of the rail and because the shape of the lower bracket corresponds to the shape of the rail, the weight of the movable barrier when the movable barrier is moved from an open position to a closed position is transferred from the bracket to the rail within the cavity of the rail itself, rather than through any fasteners securing the bracket to the rail. This configuration provides a much stronger connection between the lift cable and the movable barrier. In addition, because the bracket, along with the pin and lock securing the lift cable, are also positioned within the cavity, walls of the cavity of the rail contact the lock preventing the lock from being removed from the bracket. This, in turn, prevents removal of the pin and secures the lift cable in place.

FIG. 1 is a perspective illustration of an example movable barrier system 100, according to aspects of the present disclosure. In this example, the movable barrier is an upward acting garage door. In some examples, the movable barrier may be a sectional-type garage door. FIG. 1 illustrates a movable barrier 190 and a barrier operator 95. In some implementations, as shown in FIG. 1, the movable barrier 190 may include four sections 195 arranged vertically. The sections 195 may include various panels including opaque, transparent, or semi-transparent panels.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, the light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall of the room shown in FIG. 1 and/or the ceiling 117. In some implementations, the movable barrier 190 may include one or more rolling or sliding components on either side sized and shaped to fit within and move in a longitudinal direction along the tracks 140. The rolling or sliding components may be affixed to brackets positioned on either side of the movable barrier 190.

Components of the barrier system 100 shown in FIG. 1 may include any other suitable components. For example, the barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

FIG. 1 additionally includes a view of two lower brackets 250 positioned within the movable barrier 190. For example, a left lower bracket 250 may be positioned within the movable barrier 190 at a left lower corner of the movable barrier 190. Similarly, a right lower bracket 250 may be positioned within the movable barrier 190 at a right lower corner of the movable barrier 190. As will be explained in more detail hereafter, the left and right lower brackets 250 may be positioned within a bottom rail of the movable barrier 190. In some aspect, lift cables may be positioned on either side of the movable barrier 190 and affixed to flanges of each of the lower brackets 250. The lower brackets 250 may provide a stronger connection between the lift cables and the movable barrier 190. In addition, the lower brackets 250 may be identical and, therefore, interchangeable. That is, the left lower bracket 250 may be used as the right lower bracket 250 and vice versa. Because the lower brackets 250 are identical, fewer unique parts are required for the assembly of the movable barrier system 100, reducing manufacturing and inventory costs and complexity.

Figure 2:
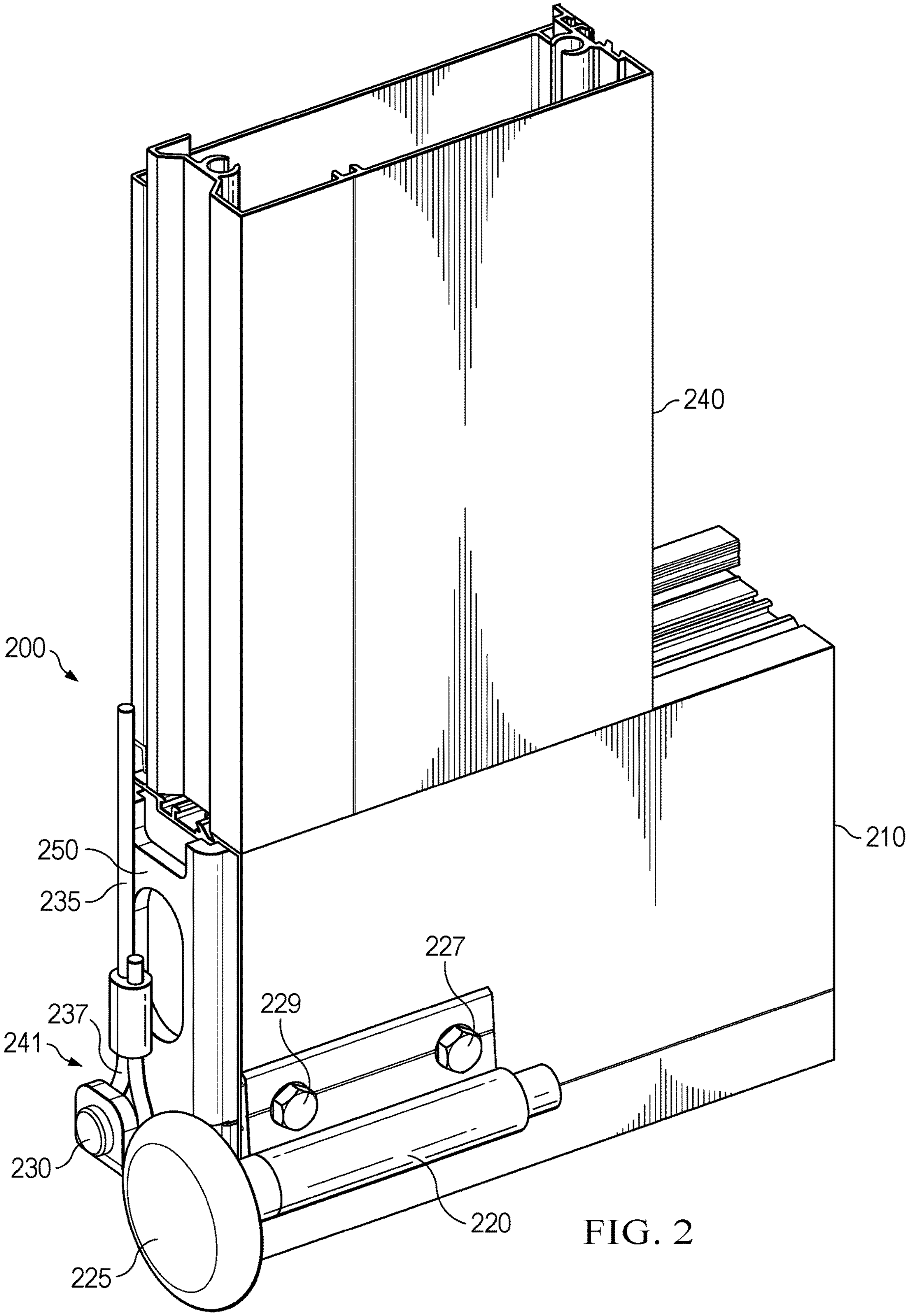
FIG. 2 is a perspective view of a lower bracket assembly of a movable barrier, according to aspects of the present disclosure.

FIG. 2 is a perspective view of a lower bracket assembly 200 of the movable barrier 190, according to aspects of the present disclosure. The movable barrier 190 may include various components. As shown in FIG. 2, the lower bracket assembly 200 may be positioned at a lower region of the movable barrier 190. For example, the movable barrier 190 may include two lower bracket assemblies 200. The lower bracket assembly 200 shown in FIG. 2 may correspond to a left lower bracket assembly 200. The left lower bracket assembly 200 may include or engage with a left side of the rail 210 shown in FIG. 2. Similarly, a right lower bracket assembly may be positioned next to or affixed to a right side of the rail 210. Such a configuration may be illustrated in FIG. 1.

The lower bracket assembly 200 includes a lower bracket 250, and a fastener or pin 230 affixed to the cable 235 including a lower loop 237. The lower bracket assembly 200 additionally includes a roller holder 220, fasteners 227 and 229, and a roller 225. FIG. 2 additionally depicts the left portion of the rail 210, as well as a stile 240.

Referring again to FIG. 1, the barrier 190 may be moved between an open position and a closed position by operation of the barrier operator 95. In some aspects, the barrier operator 95 may turn cable drums 132 to cause movement of the barrier 190. For example, the barrier operator 95 may rotate the cable drums 132 to lift and/or lower the barrier 190. A cable, such as the cable 235 shown and FIG. 2, may be positioned or wrapped around cable drop 132. For example, the movable barrier 190 may be affixed to two cables 235 on a left side and a right side of the movable barrier 190. Each of these cables 235 may be affixed to a corresponding cable drum 132. To lift the movable barrier 190 from a closed position to an open position, the barrier operator 95 may turn the shaft 130 thus turning each cable 235 around a corresponding cable drum 132 producing an upward acting force on each cable 235. Because each cable 235 is affixed to a corresponding lower bracket of the movable barrier 190, the movable barrier 190 may move upward along the tracks 140 as the cables 235 on either side of the movable barrier 190 are wrapped around the rotating cable drums 132.

In the configuration shown in FIG. 2, the lower bracket assembly 200 may provide additional strength to the connection between the cable 235 to the lower region of the movable barrier 190 (e.g., the lower rail 210 shown). As shown in FIG. 2, a loop 237 formed in a lower end of the cable 235 may receive a pin 230. In this way, the pin 230 may secure the cable 235 to the lower bracket 250. The lower bracket 250 may then be affixed to the movable barrier 190. Typical movable barriers may be affixed to a lift cable by corresponding lower brackets with one or more fasteners, such as the fasteners 227 or 229. In such a configuration, the upward acting force provided by the barrier operator moving the cables in an upward direction may be transferred to the movable barrier through the fasteners alone. In such a configuration, the attachment of the lift cables to the movable barrier may be prone to failure due to weak fasteners or wear caused by attaching the fasteners to the movable barrier and/or the lower bracket. In this way, the overall strength of the connection of the cable to the movable barrier is decreased. In the implementation of the lower bracket assembly 200 shown in FIG. 2, however, the upward acting force provided by the barrier operator 95 on the cable 235 is transferred to the movable barrier 190 within the lower rail 210 because the lower bracket 250 is positioned within the lower rail 210. As will be explained in more detail with reference to a FIG. 3, a top surface of the lower bracket 250 may contact or mate with an inner surface of the cavity defined by the lower rail 210. In this way, as the cable 235 is moved upward this force is transferred through the pin 230 to the bracket 250 and to the rail 210 due to the relative positions of each of these components. In this way, no fasteners bear the weight of the movable barrier 190 alone. Rather, the weight of the barrier 190 as it is moved from a closed position to an open position is supported within the rail 210 of the barrier 190 itself.

In the example shown in FIG. 2, the roller 225 may be positioned within the left track 140 shown in FIG. 1. The fasteners 227 and 229 may be positioned through corresponding holes within the roller holder 220 as well as through corresponding holes within the lower rail 210 and the lower bracket 250. In some aspects, the fasteners 227 and 229 may affix the roller holder 220, and subsequently the roller 225, to the movable barrier 190 as the movable barrier 190 is moved between a closed position and an open position. The roller 225 may prevent movement of the movable barrier 190 in directions perpendicular to the track 140. However, because the weight of the movable barrier 190 is supported by the lower bracket 250 within the rail 210, the roller holder 220 and corresponding fasteners 227 and 229 may not bear the weight of the movable barrier 190 itself but only prevent perpendicular movement of the barrier 190.

Figure 3:
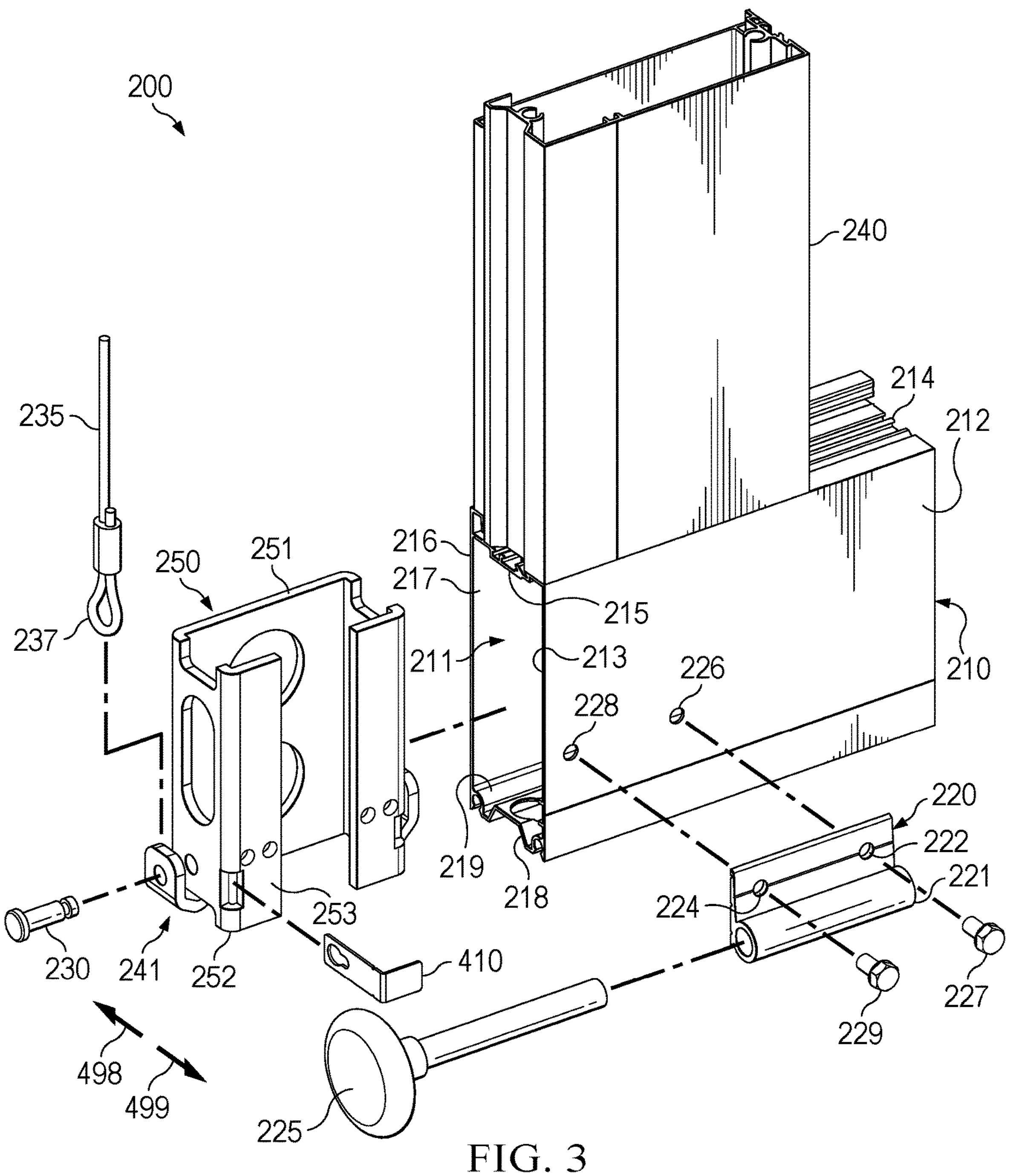
FIG. 3 is an exploded perspective view of a lower bracket assembly of a movable barrier, according to aspects of the present disclosure.

FIG. 3 is an exploded perspective view of the lower bracket assembly 200 of the movable barrier 190, according to aspects of the present disclosure. FIG. 3 provides additional details of the lower bracket assembly 200 as will be explained.

During assembly of the movable barrier system 100 (FIG. 2), the lower bracket 250 may be positioned within a left cavity 211 of the rail 210. In some aspects, and as shown in FIG. 3, the left cavity 211 may be defined by multiple inner surfaces of the rail 210. For example, the rail 210 may include at least four walls. The rail 210 may include an inner wall 212, an upper wall 214, an outer wall 216, and a lower wall 218. The cavity 211 formed within the left end of the rail 210 may be at least partially defined by an inner surface 213 of the inner wall 212, an inner surface 215 of the upper wall 214, an inner surface 217 of the outer wall 216, and an inner surface 219 of the lower wall 218.

A top surface 251 of the bracket 250 may be of a profile that matches the profile of the inner surface 215. Similarly, a lower surface 252 of the bracket 250 may be of a profile that matches the profile of the inner surface 219. In this way, surfaces of the bracket 250 may mate with corresponding surfaces of the rail 210. During assembly, the bracket 250 may be slid in a direction parallel to the rail 210 into the cavity 211 of the rail 210. In an assembled configuration, such as the one shown in FIG. 2, surfaces of the bracket 250 may contact any of the inner surfaces 213, 215, 217, and/or 219 shown in FIG. 3. As described, the upper surface 251 may be a bearing surface. Similarly, the corresponding inner surface 215 of the rail 210 may be a bearing surface. For the purposes of this disclosure, a bearing surface may be a surface of any component of the movable barrier system 100 which transfers a mechanical force or stress from one component to another. In this way, the upper surface 251 of the lower bracket 250 may transfer an upward acting force imposed on the bracket 250 by the cable 235 to the inner surface 215 of the rail 210.

FIG. 3 additionally shows a lock 410 of the anchor system. As will be explained with reference to FIGS. 4, 5A-5D, and 6, the lock 410 may engage a distal end of the pin 230 and secure the pin 230 in place. For example, the pin 230 may be positioned through holes of the lower bracket 250 as well as the loop 237 of the cable 235. In an assembled configuration, a distal end of the pin 230 may be positioned within an inner region of the bracket 250. In this position, the distal end of the pin 230 may be positioned through a hole or slot of the lock 410, as will be described in more detail here after. In some aspects, the pin 230 may be positioned through the holes of the bracket 250 as well as the loop 237 of the cable 235 before the bracket 250 is positioned within the cavity 211. In this way, the lock 410 may be positioned through the opening 267 (describe with reference to FIG. 4) to secure the pin 230. In an assembled configuration, a tab 414 (shown and described with reference to FIG. 5A) of the lock 410 may contact an outer surface 253 of the lower bracket 250. In such a configuration, the bracket 250 may be slid into position within the cavity 211 of the rail 210. In this way, the tab 414 of the lock 410 may be positioned between the outer surface 253 of the lower bracket 250 and the inner surface 213 of the inner wall 212 of the rail 210. With the tab 414 of the lock 410 sandwiched between the surface 253 and the surface 213 in an assembled configuration, the bracket 250 and the rail 210 may prevent movement of the lock 410 in directions 497 or 498, transverse to the movable barrier 190. By preventing movement of the lock 410 in the directions 497 or 498, the pin 230 may be prevented from being removed from the lower bracket 250 securing the cable 235 to the movable barrier 190.

FIG. 3 additionally shows an exploded view of the roller 225, the roller holder 220, and corresponding components. For example, the roller holder 220 may be affixed to the rail 210 by the fasteners 227 and 229. Holes 222 and 224 may be within the roller holder 220. Corresponding holes 226 and 228 may be positioned within the inner wall 212 of the rail 210. The fasteners 227 and 229 may be positioned respectively within the holes 222 and 224, and the holes 226 and 228 securing the roller holder 220 to the rail 210. In some aspects, as will be described in greater detail with reference to FIG. 4, additional holes may be positioned within the lower bracket 250 to receive the fasteners 227 and 229. The roller holder 220 may include a roller tube 221. The roller 221 may include an inner lumen sized and shaped to receive a cylindrical portion of the roller 225. As described with reference to FIG. 2, the roller 225 and corresponding roller holder 220 may prevent movement of the movable barrier 190 from the track 140 in directions 497 and 498.

Figure 4:
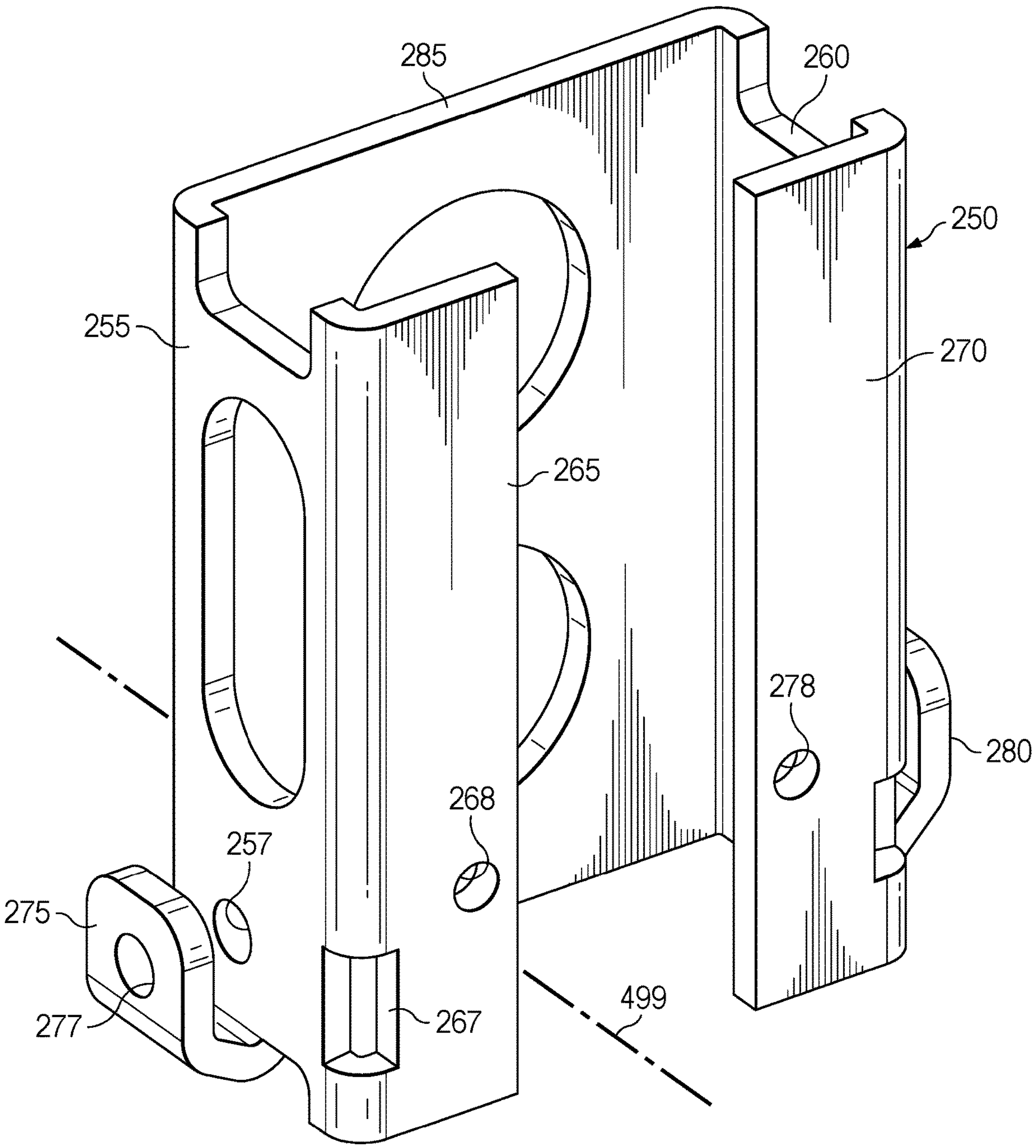
FIG. 4 is perspective view of a lower bracket of a movable barrier, according to aspects of the present disclosure.

FIG. 4 is perspective view of the lower bracket 250 of a movable barrier 190, according to aspects of the present disclosure. The lower bracket 250 shown in FIG. 4 may include a rear wall 285, a left wall 255, a right wall 260, and a front wall 265, and a front wall 270. As shown in FIG. 4, a flange 275 may extend from the left wall 255. For example, as shown in FIG. 4, the flange 275 may be affixed to a lower portion of the left wall 255. In some aspects, the flange 275 and the left wall 255 may be parts of a unitary structure. In some aspects, each wall or component of the lower bracket 250 may be parts or components of the same unitary structure.

The flange 275 may include a hole 277. A corresponding hole 257 may be positioned within the left wall 255. The flange 275 may be spaced from the left wall 255 such that the cable 235, described with reference to FIGS. 2 and 3, may be positioned between the flange 275 and the wall 255. In this way, the flange 275 may be offset from the wall 255 so as to create a space between the flange 275 and the wall 255. As previously described, the hole 277 and the hole 257 may be aligned such that each of these holes 277 and 257 may receive the pin 230 therethrough. The pin 230, the lock 410, the holes 277 and 257, and the flange 275 or wall 255 may be referred to as an anchor system 241 of the lower bracket 250 since the lift cable may connect to the bracket using these features or using other anchor-like attachment features. For example, the anchor system 241 may be any element projecting from the bracket for connection (e.g., anchoring) to the lift cable.

At a transitional region between the left wall 255 and the front wall 265, an opening 267 may be present. As mentioned with reference to FIG. 3, the opening 267 may receive the lock 410. In this way, the pin 230 may be inserted from an outer region of the lower bracket 250 through the hole 277, then through the loop 237 of the cable 235, through the hole 257, and then through an opening of the arm 412 of the lock 410 as will be described in more detail hereafter.

The holes 268 and 278 may receive fasteners, such as the fasteners 227 and 229 described with reference to FIGS. 2 and 3. In some aspects, the holes 268 and 278 may be threaded so as to mate with threads of the fasteners 227 and 229. In other aspects, the fasteners 227 and 229 may be affixed to other receiving components, such as nuts, positioned within an inner region of the bracket 250. In this way, the holes 268 and 278 may align with corresponding holes within the rail 210 on both a left and a right side of the rail 210, as well as holes within the roller holder 220.

As shown in FIG. 4, the lower bracket 250 may be symmetrical about a central transverse axis 499. For example, a flange 280 may be positioned extending from a lower region of the right wall 260. The flange 280 may be substantially similar to the flange 275 previously described. For example, the flange 280 may include a hole which is aligned with a corresponding hole within a lower region of the wall 260. Like the flange 275 described previously, the flange 280 may create a space between the hole within the flange 280 and the hole within the right wall 260. A loop of a cable, such as the cable 235 positioned on a right side of the movable barrier 190 may be positioned within this space between the flange 280 and the right wall 260. A similar pin 230 may be positioned through each of the holes within the flange 280 and the right wall 260. A similar lock 410 may secure the pin 230 to the lower bracket 250. In this way, the same lower bracket 250 may be used to affix a left cable to a left lower side of the movable barrier 190 or may be used to affix a right cable to a right lower side of the movable barrier 190. In some aspects, during an installation or assembly of the movable barrier system 100, two lower brackets 250 may be provided. One lower bracket 250 may be used within a left cavity of the rail 210, as shown and described with reference to FIGS. 2 and 3, and a second lower bracket 250 may be used within a right cavity of the rail 210.

Because the lower bracket 250 is symmetrical, or, in other words, ambidextrous, fewer unique components are required for the assembly or servicing of the movable barrier system 100. Because fewer unique components are used in the movable barrier system 100, manufacturing costs of the movable barrier system 100 may be decreased. In addition, inventory complexity may be decreased.

Figure 5A:
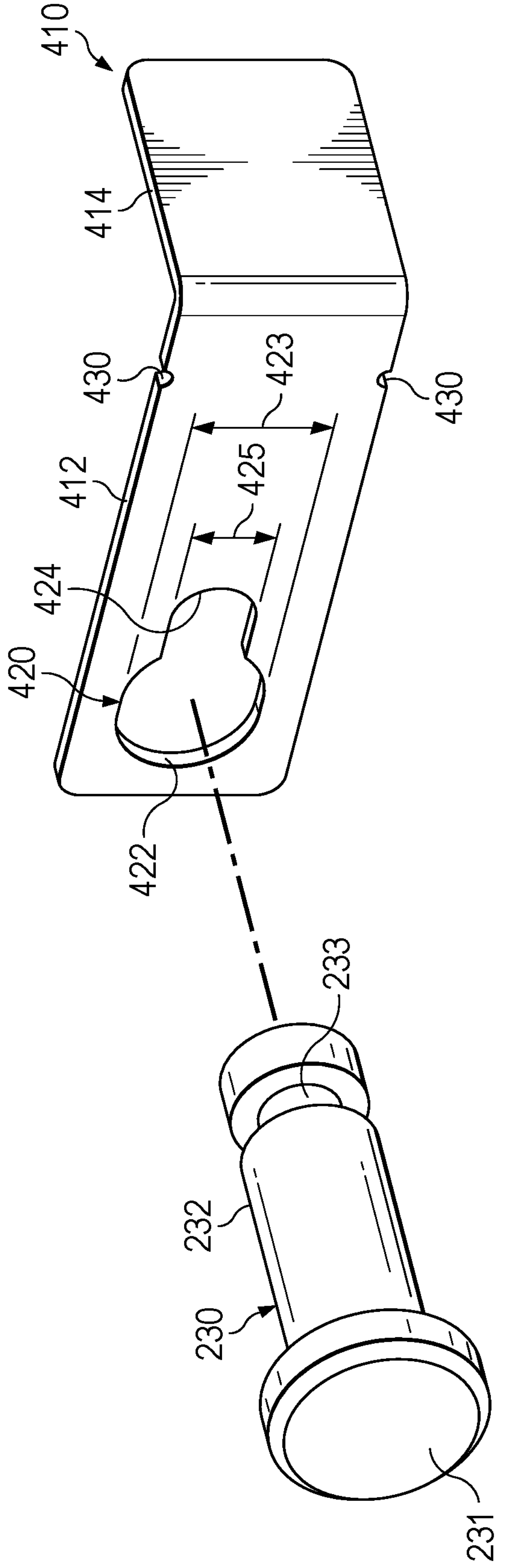
FIG. 5A is a perspective view of a pin and a corresponding lock, according to aspects of the present disclosure.

FIG. 5A is a perspective view of the pin 230 and the corresponding lock 410, according to aspects of the present disclosure. The pin 230 include a head 231 and a shaft 232. In some aspects, a cross-sectional shape of the shaft 232 of the pin 230 may be a circle. In other aspects, the cross-sectional shape of the shaft 232 may be any other suitable shape. In some aspects, a diameter of the circular shaft 232 may correspond to a diameter of the holes 277 and 257 of the lower bracket 250 described with reference to FIG. 4. Similarly, the diameter of the circular shaft 232 may correspond to a diameter of the hole 422 of the lock 410 described hereafter. In some aspects, and as shown in FIG. 5A, the shaft 232 may include an annular groove 233. The annular groove 233 may be positioned at a distal region of the shaft 232. In some aspects, the shaft 232 may alternatively be referred to as an interface portion. In some aspects, a distal region or distal end of the shaft 232 may be referred to as an interface portion. As described with reference to the lock 410, the interface portion of the pin 230 may interface with a corresponding interface portion of the lock 410. For example, the bayonet hole 420, including the circular region 422 and/or longitudinal region 424, may also be referred to as an interface portion.

As shown in FIG. 5A, the head of the pin 231 may not be necessary since the pin is retained from moving "forward" or "backward" in the holes because of the engagement of the annular groove in the pin secured inside the wall of the clip.

The lock 410 is also shown in FIG. 5A. The lock 410 may include a main body 412 and a tab 414. The lock 410 may additionally be referred to as a retainer clip, a retaining clip, a clip, or by any other suitable term. The tab 414 and the main body 412 may be one unitary structure. In some aspects, the tab 414 may extend in a perpendicular direction from the main body 412. In some aspects, a length of the main body 412 may be greater than a length of the tab 414. As shown in FIG. 5A, an opening 420 may be positioned within the main body 412. In some aspects, the opening 420 may be positioned within a distal region of the main body 412. The opening 420 may include a circular region 422 and a longitudinal region 424. In some aspects, the circular region 422 may be of a diameter 423 and the longitudinal region 424 may be of a width 425. The diameter 423 may correspond to an outer diameter of the shaft 232. In this way, the shaft 232 of the pin 230 may be insertable through the main body 412 of the lock 410 through the circular region 422. The pin 230 may be slid through the opening 423 such that the annular groove 233 is aligned with the main body 412 of the lock 410. In this position, the lock 410 may be slid toward the pin 230 such that the annular groove is moved within the longitudinal region 424. In this way, the longitudinal region 424 may engage the annular groove 233. In some aspects, the width 425 of the longitudinal region 424 may correspond to the diameter of the annular groove 233.

As shown in FIG. 5A, the width 425 of the longitudinal region 424 may be less than the diameter 423 of the circular region 422. Due to this difference in size between the width 425 and the diameter 423, when the annular groove 233 is positioned within the longitudinal region 424, the pin 230 may not be moved in or out of the opening 420 without disengaging the annular groove 233 from the longitudinal region 424. Specifically, the pin may first be moved to the circular region 422 and then the pin 230 may be moved out of the opening 420 of the lock 410. In this way, the lock 410 may retain the pin 230 from movement.

In some aspects, the head 231 of the pin 230 may be of a diameter that is larger than the diameter of the shaft 232 and/or the circular region 422. As a result, the head 231 may not be moved through the opening 420. Similarly, the head 231 may not be moved through the holes 277 and/or 254 of the lower bracket 250 (FIG. 4). In this way, the head 231 may prevent motion of the pin 230. In some aspects, the opening 420 of the lock 410 may be referred to as a bayonet hole. For purposes of this disclosure, a bayonet hole may include a hole including a region of larger dimensions than another connected region. In this way, a part or component may be inserted through the larger opening and slid into the smaller opening, locking the part or component in place.

As shown in FIG. 5A, the lock 410 may additionally include notches 430. For example, a notch 430 may be positioned along an upper edge and a lower edge of the main body 412. The notches 430 may also be referred to as indicators, alignment indicators, aligners, or any other suitable term. In some aspects, the notches 430 may be positioned along the main body 412 such that when the notches 430 are aligned with a surface of the lower bracket 250 (FIG. 4), the circular region 422 of the lock 410 is aligned with the holes 277 and 257 of the lower bracket 250 allowing the pin 230 to pass through the holes 277 and 257 and the circular region 422. Additional aspects of the notches 430 as well as the positional relationship between the pin 230, the lock 410, and the lower bracket 250 will be described in greater detail with reference to FIGS. 5B-5D below.

Figure 5B:
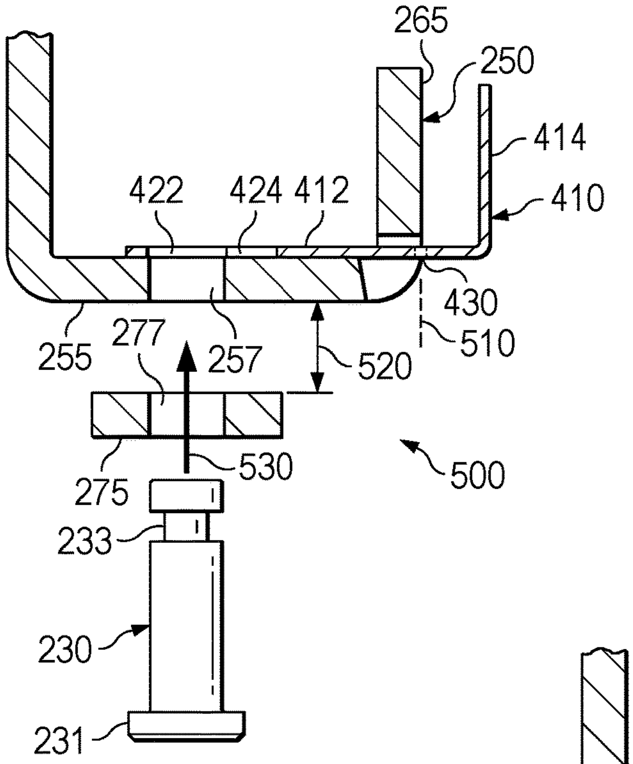
FIG. 5B is a cross-sectional top view of an anchor assembly having a pin, a lock, and a lower bracket, according to aspects of the present disclosure.

FIG. 5B is a cross-sectional top view 500 of the pin 230, the lock 410, and the lower bracket 250, according to aspects of the present disclosure. As will be explained herein, FIGS. 5B-5D may illustrate aspects of assembly of the lower bracket 250, the pin 230, and the lock 410. In some aspects, the assembly of the lower bracket 250, the pin 230, and the lock 410 may include securing a lift cable to the lower bracket 250 and the movable barrier 190.

As shown in FIG. 5B, the lock 410 may be aligned with the lower bracket 250 prior to the pin 230 being inserted. For example, the notch 430 may be aligned with an outer surface of the front wall 265 of the lower bracket 250 as shown by the line 510. In this configuration, the circular region 422 may be aligned with the hole 257 of the lower bracket 250 and the hole 277 of the lower bracket 250.

The cross-sectional top view 500 also illustrates how the lower bracket 250 separates the flange 275 from the left wall 255 by a space 520. In some aspects, during an assembly process, a lift cable (e.g., the lift cable 235) or a loop of a lift cable (e.g., the loop 237) may be positioned within the space 520 between the left wall 255 and the flange 275.

In the position shown and described with reference to FIG. 5B and with the loop 237 positioned between the flange 275 and the left wall 257 and aligned with the holes 277 and 257, the pin may be inserted through the hole 277, the loop 237, the hole 257, and the circular region 422 in the direction shown by the arrow 530.

It is additionally noted that the notches 430 of the lock 410 may be positioned at any suitable location along the edges of the main body 412. For example, the notches 430 may be positioned such that the circular region 422 algins with the holes 277 and 257 when the notches 430 are aligned with an inner surface of the front wall 265 of the lower bracket 250, an edge of the left wall 255 of the lower bracket 250, corresponding indicators, notches, or holes within the left wall 255 of the lower bracket 250, or any other features.

Figure 5C:
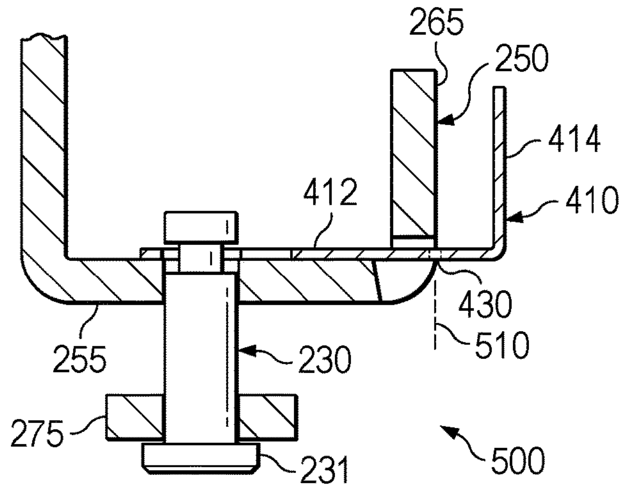
FIG. 5C is a cross-sectional top view of an anchor assembly having a pin, a lock, and a lower bracket, according to aspects of the present disclosure.

FIG. 5C is a cross-sectional top view 500 of the pin 230, the lock 410, and the lower bracket 250, according to aspects of the present disclosure. FIG. 5C may illustrate the view after the pin 230 has been positioned within the hole 277, the loop 237, the hole 257, and the circular region 422 of the lock 410. The pin 230 may be moved through each of these structures in the direction 530 shown and described with reference to FIG. 5B. In some aspects, the head 231 of the pin 230 may stop motion of the pin in the direction 530 through the hole 277. In this way, the pin 230 may be sized and shaped such that the head 231 contacts the outward facing surface of the flange 275 when the annular groove 233 of the pin is aligned with the main body 412 of the lock 410.

Figure 5D:
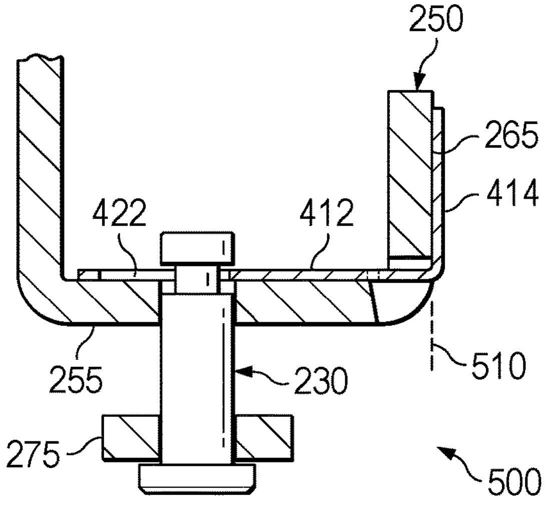
FIG. 5D is a cross-sectional top view of an anchor assembly having a pin, a lock, and a lower bracket in an assembled configuration, according to aspects of the present disclosure.

FIG. 5D is a cross-sectional top view 500 of the pin 230, the main body 412, and the lower bracket 250 in an assembled configuration, according to aspects of the present disclosure.

After the pin 230 is inserted through the hole 277, the loop 237 (FIG. 3), the hole 257, and the circular region 422 such the head 231 contacts the outward facing surface of the flange 275 and the annular groove 232 is aligned with the main body 412 of the lock 410, the lock 410 may be slid toward the pin 230 to the position shown in FIG. 5D. In such a position, the longitudinal region 424 (FIG. 5A-5B) may engage around the annular groove 233. In some aspects, the lock 410 may be sized and shaped such that when an inner surface of the tab 414 of the lock 410 contacts the outer surface of the front wall 265, the annular groove 233 of the pin 230 is positioned within the longitudinal region 424. In this position, the pin 230 may be prevented from moving in the direction 530 (FIG. 5B) both because the diameter of the shaft 232 (FIG. 5A) is larger than the diameter of the annular groove 233 and the width 425 of the longitudinal region 424 and because the diameter of the head 231 is larger than the diameter of the hole 277. Due to the relative diameters of the annular groove 233 and shaft 232 as well as the width 425 of the longitudinal region 424, the pin 230 may also be prevented from moving in a direction opposite the direction 530, thus locking the pin in place. In this way, the lift cable 235 (FIG. 3) is secured to the lower bracket 250.

In some aspects, the lock 410 may be prevented from moving out of the position shown in FIG. 5D by an additional structure contacting an outer surface of the tab 414. For example, the bracket assembly 250 along with the pin 230 and lock 410 as shown in FIG. 5D may be positioned within a cavity (e.g. the cavity 211 of FIG. 3) of the rail 210 (FIG. 3). In this way, the inner surface 213 of the cavity 211 may contact the outer surface of the tab 414 thus preventing the lock 410 from moving out of the lower bracket 250 and securing the pin 230 and lift cable 235 in place.

Figure 6:
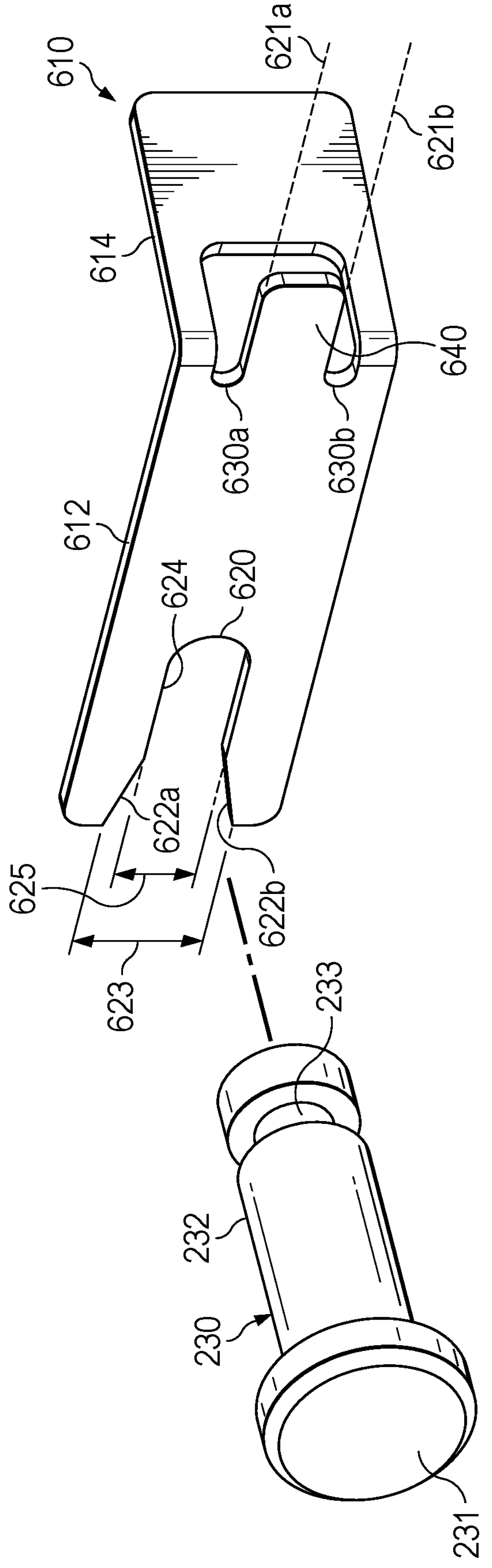
FIG. 6 is a perspective view of a pin and a corresponding lock, according to aspects of the present disclosure.

FIG. 6 is a perspective view of the pin 230 and a corresponding lock 610, according to aspects of the present disclosure. In some aspects, the lock 610 may be used in the same way as the lock 410. For example, the lock 610 may be positioned in the same positions relative to the pin 230 and the lower bracket 250 as previously described.

As shown in FIG. 6, the lock 610 may include an main body 612 and a tab 614. The main body 612 may include a slot 620. The slot 620 may form an opening at a distal end of the main body 612. The opening may be configured to receive the annular groove 233 of the pin 230. The slot 620 may include two angled surface 622*a* and 622*b* defining a distal region of the slot 620. The slot 620 may also include a longitudinal region 624 positioned proximal to the angled surfaces 622*a* and 622*b*.

At a distal edge of the main body 612, the angled surfaces 622*a* and 622*b* may define a width 623. In some aspects, the width 623 may correspond to the diameter of the shaft 232 of the pin 230. In some aspects, the width 623 may be greater or less than the diameter of the shaft 232. The angled surfaces 622*a* and 622*b* may transition the width of the slot 620 from the width 623 at the distal edge to the width 625. The width 625 may be defined by the longitudinal region 624. Like the width 425 of the longitudinal region 424 of the opening 420, the width 625 may correspond to the diameter of the annular groove 233.

In some aspects, the lock 610 may include an additional handle 640. The handle 640 may be used by an assembler of the movable barrier system 100 during assembly or disassembly. For example, the assembler may grasp the handle 640 to position the lock 610 within the lower bracket 250 to secure the pin 230.

In some aspects, the lock 610 may include an additional feature on the handle 640 that provides a stopping surface that prevents the lower bracket from sliding too far into the rail cavity.

The lock 610 may additionally include notches 630*a* and 630*b*. The notches 630*a* and 630*b* may be aligned with slot 620. In some aspects, an inner portion of each of the notches 630*a* and 630*b* and/or the outer surfaces of the handle 640 may align with the inner surfaces of the longitudinal region 624 as shown by the lines 621*a* and 621*b*. In this way, the notches 630*a* and 630*b* may show where the slot 620 is positioned while the distal region of the lock 610 is not visible within the lower bracket 250. In this way, the notches 630*a* and 630*b* may aid an assembler in aligning the slot 620 with the annular groove 233 of the pin 230.

In some aspects, the pin 610 may allow for a different order of steps of assembly of the pin 230, the lock 610, and the lower bracket 250 than the order described with reference to FIGS. 5B-5D. For example, the pin 230 may be first inserted through the hole 277, the loop 237 (FIG. 3), and the hole 257 before the lock 610 is inserted within the lower bracket 250. After the pin 230 is inserted such that the head 231 contacts the outer surface of the flange 275 (FIGS. 5B-5D), the pin 610 may be inserted through the opening 267 (FIG. 4) of the lower bracket 250. Based on the positions of the notches 630*a* and 630*b*, the lock 610 may be inserted so as to receive the annular groove 233 within the slot 620. In some aspects, the angles surfaces 622*a* and 622*b* and wider width 623 may direct the lock 610 as the lock 610 is inserted such that the annular groove 233 is positioned within the longitudinal region 624 even if the lock 610 is not initially perfectly aligned with the pin 230. The lock 610 may be inserted until the inner surface of the tab 614 contacts the outer surface of the front wall 265 of the lower bracket 250.

In some aspects, the lock 610 may include any of the features of the lock 410 shown and described with reference to FIGS. 5A-5D, including the notches 430. IN this way, the pin 610 may be positioned within the bracket 250 and aligned with various surfaces of the bracket and then the pin 230 may be inserted or vice versa as described.

Figure 7:
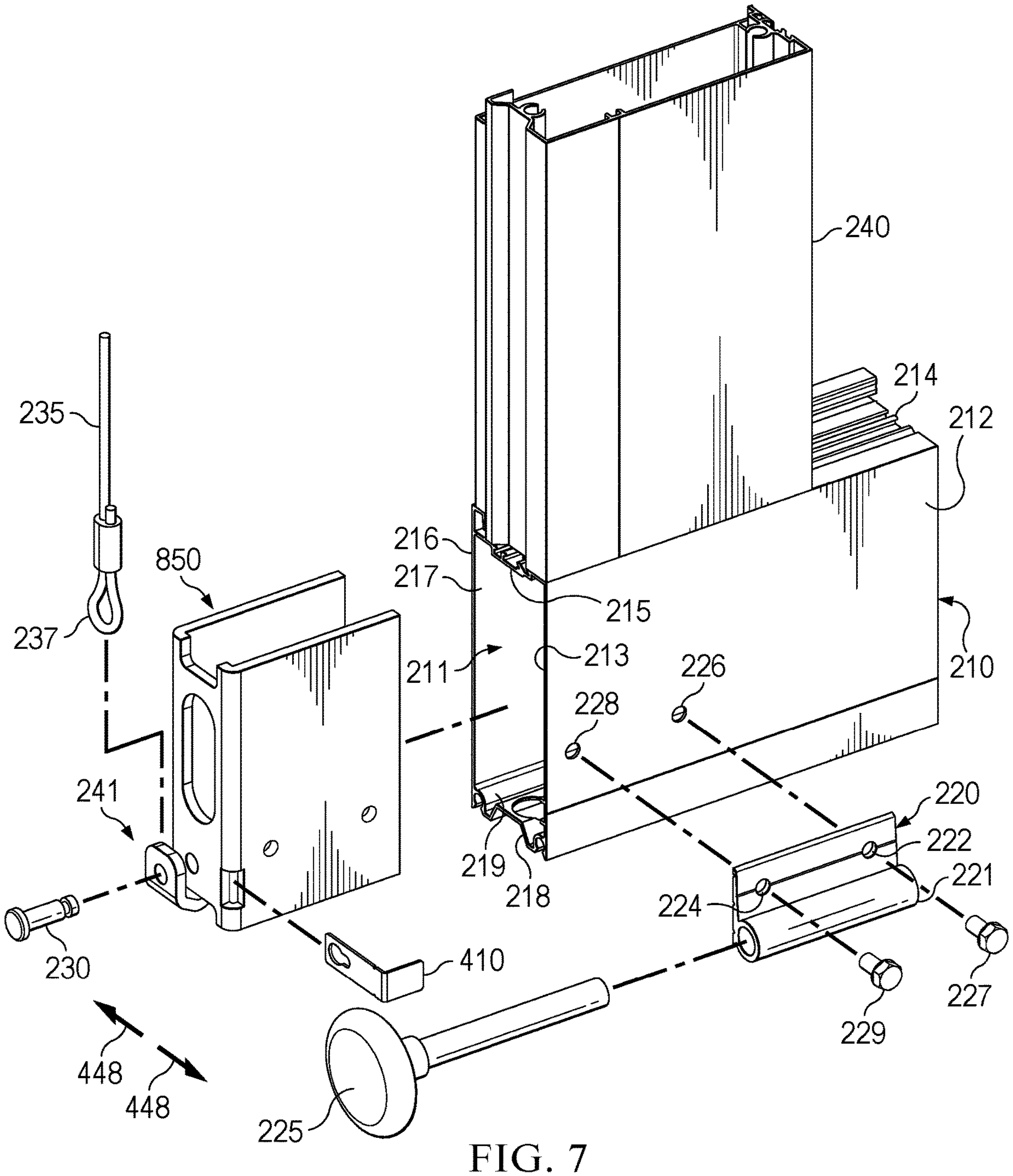
FIG. 7 is an exploded perspective view of a lower bracket assembly of a movable barrier, according to aspects of the present disclosure.

FIG. 7 is an exploded perspective view of a lower bracket assembly of a movable barrier, according to aspects of the present disclosure. The exploded perspective view shown in FIG. 7 may include many of the same parts or components as described with reference to FIG. 3. However, the exploded view of FIG. 7 may include a lower bracket 850.

The lower bracket 850 may also be used to secure the cable 235 to the movable barrier 190. Like the lower bracket 250, the lower bracket 850 may be positioned within a left cavity 211 of the rail 210 to secure a left cable (e.g., the cable 235) to the left side of the movable barrier 190. In addition, the lower bracket 850 may be positioned within an opposite right cavity of the rail 210 to secure a right cable to the right side of the movable barrier 190.

In some aspects, unlike the lower bracket 250 the lower bracket 850 may not be symmetrical about a transverse axis. However, the lower bracket 850 may be symmetrical about a longitudinal axis (e.g., the axis 899 shown in FIG. 8). In this way, the lower bracket 850 may be positioned within the left cavity 211 as shown in FIG. 7. Then, to attach a right cable to the right side of the movable barrier 190, the lower bracket 850 may be flipped in an opposite direction such that the flange of the lower bracket 850 extends from the right side of the movable barrier 190.

Figure 8:
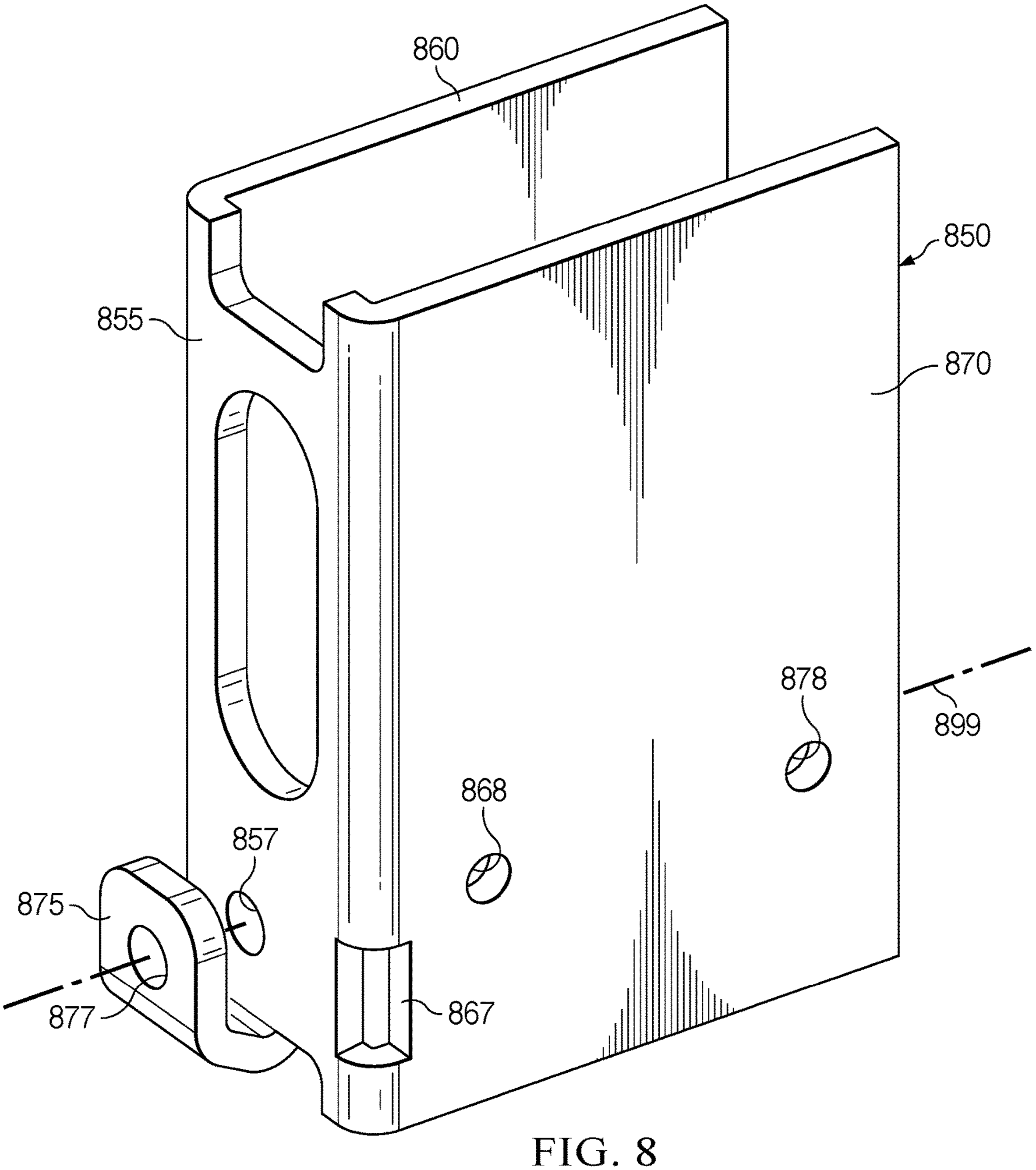
FIG. 8 is a perspective view of a lower bracket of a movable barrier, according to aspects of the present disclosure.

FIG. 8 is a perspective view of the lower bracket 850 of a movable barrier, according to aspects of the present disclosure. The perspective view of the lower bracket 850 may provide additional details of the lower bracket 850.

The lower bracket 850 may include a rear wall 860, a left wall 855, and a front wall 870. Like the flange 275, a flange 875 may extend from the left wall 855. A hole 877 may be positioned within the flange 875 and a hole 857 may be positioned within the left wall 855. The hole 877 and the hole 857 may be aligned to receive the pin 230. The opening 867 positioned within a transition between the left wall 855 and the front wall 870, like the opening 267 described with reference to FIG. 4, may receive the lock 410. In this way, the lower bracket 850, the pin 230, the cable 235, and lock 410 may be assembled in the same positions relative to each other and other components of the movable barrier 190 as the lower bracket 250 described with reference to FIG. 4.

The lower bracket 850 may include holes 868 and 878. The holes 868 and 878 may be positioned within the front wall 870. The holes 868 and 878 may be aligned with corresponding holes within the rail 210 and the roller holder 220. For example, the holes 868 and 878 may be aligned with the holes 228, 226, 224, and or 222 shown and described with reference to FIG. 3 and FIG. 7.

As previously mentioned, the lower bracket 850 may be symmetrical about the longitudinal axis 899. In this way, the back wall 860 may include similar holes to the holes 868 and 878. In this way, in the orientation shown in FIG. 8, when the lower bracket 850 is positioned within the left cavity 211 of the lower rail 210, the holes 868 and 878 may receive the fasteners 227 and 229. However, when positioned within a right cavity of the rail 210, the bracket 850 may be rotated about a vertical axis and slid in a left direction into the right cavity of the rail 210. In this orientation, holes within the back wall 860 may then receive fasteners such as the fasteners 227 and 229 corresponding to a roller holder on the right side of the movable barrier 190.

Figure 9A:
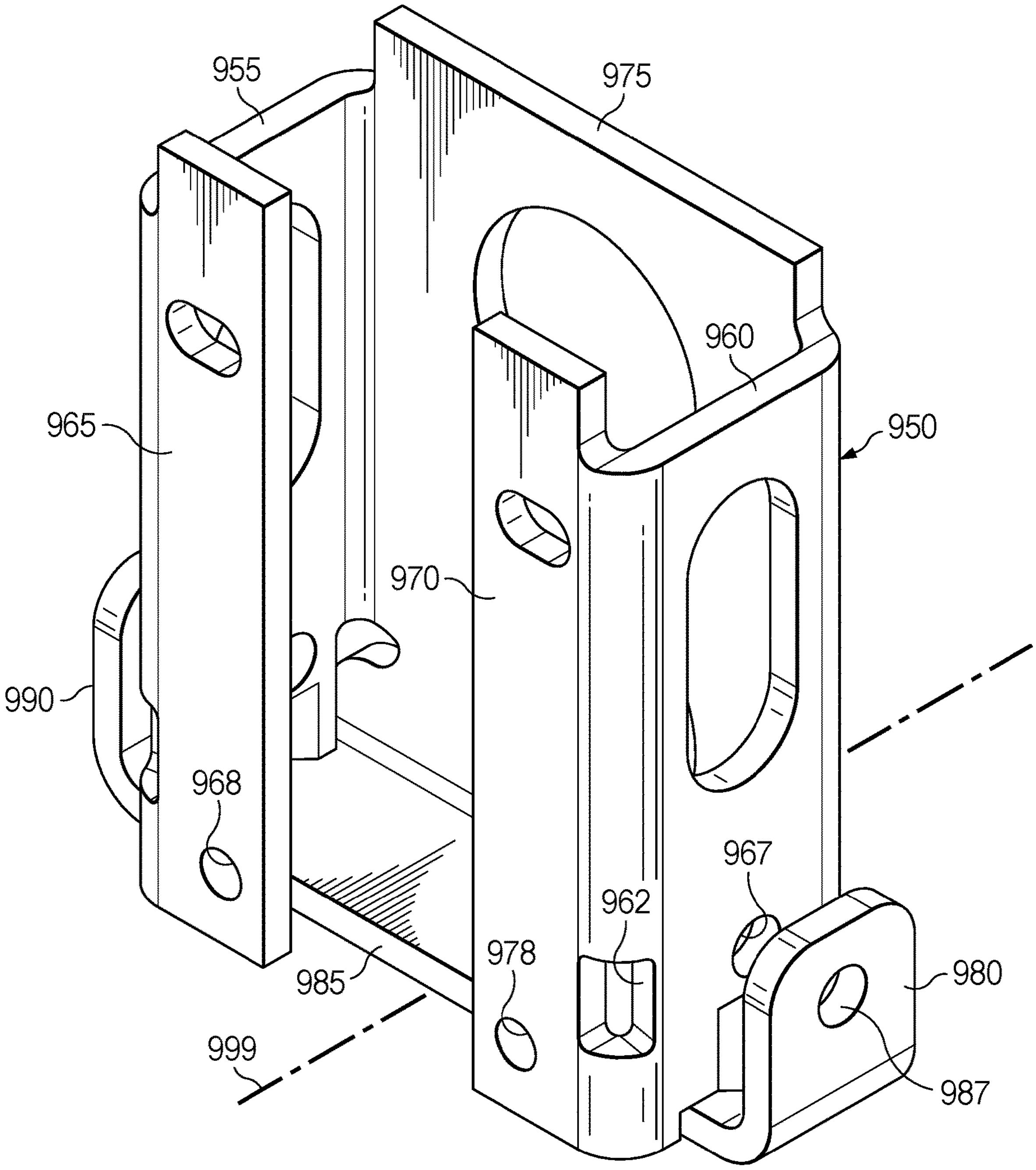
FIG. 9A is a perspective view of a lower bracket of a movable barrier, according to aspects of the present disclosure.

FIG. 9A is a perspective view of a lower bracket 950 of a movable barrier, according to aspects of the present disclosure. FIG. 9A may provide a front view of the lower bracket 950 described below.

Like the lower brackets 250 and 850, the lower bracket 950 shown and described with reference to FIG. 9A may be used to affix a cable to the movable barrier 190. Similarly, the lower bracket 950 may be used to affix a left cable to a left side of the movable barrier 190 as well as a right cable to a right side of the movable barrier 190. Like the lower bracket 250, the lower bracket 950 may be symmetrical about a transverse axis 999.

The lower bracket 950 may include a rear wall 975, a left wall 955, a right wall 960, a front wall 965, and a front wall 970. Similar to the lower bracket 250 described previously, the lower bracket 950 may include a flange 980 extending from the right wall 960. The flange 980 may include a hole 987. The right wall 960 may include a hole 967. The holes 987 and 967 may be aligned so as to receive the pin 230. The flange may provide a space between the flange 980 and the right wall 960. A cable, such as the cable 235 may be positioned within the space between the flange 980 and the wall 960. An opening 962 may receive the lock 410. Holes 968 and 978 may receive fasteners, such as the fasteners 227 and 229 previously described. A flange 990 may extend from the left wall 955 and may be substantially similar to the flange 980 but symmetrical. The lower bracket 950 may additionally include a lower wall 985. In some aspects, the lower wall 985 may be a same unitary structure as the flange 980 and the flange 990. Wall 985 may be additionally supported with a stiffening rib or “knee” formed into walls 955 & 960.

Figure 9B:
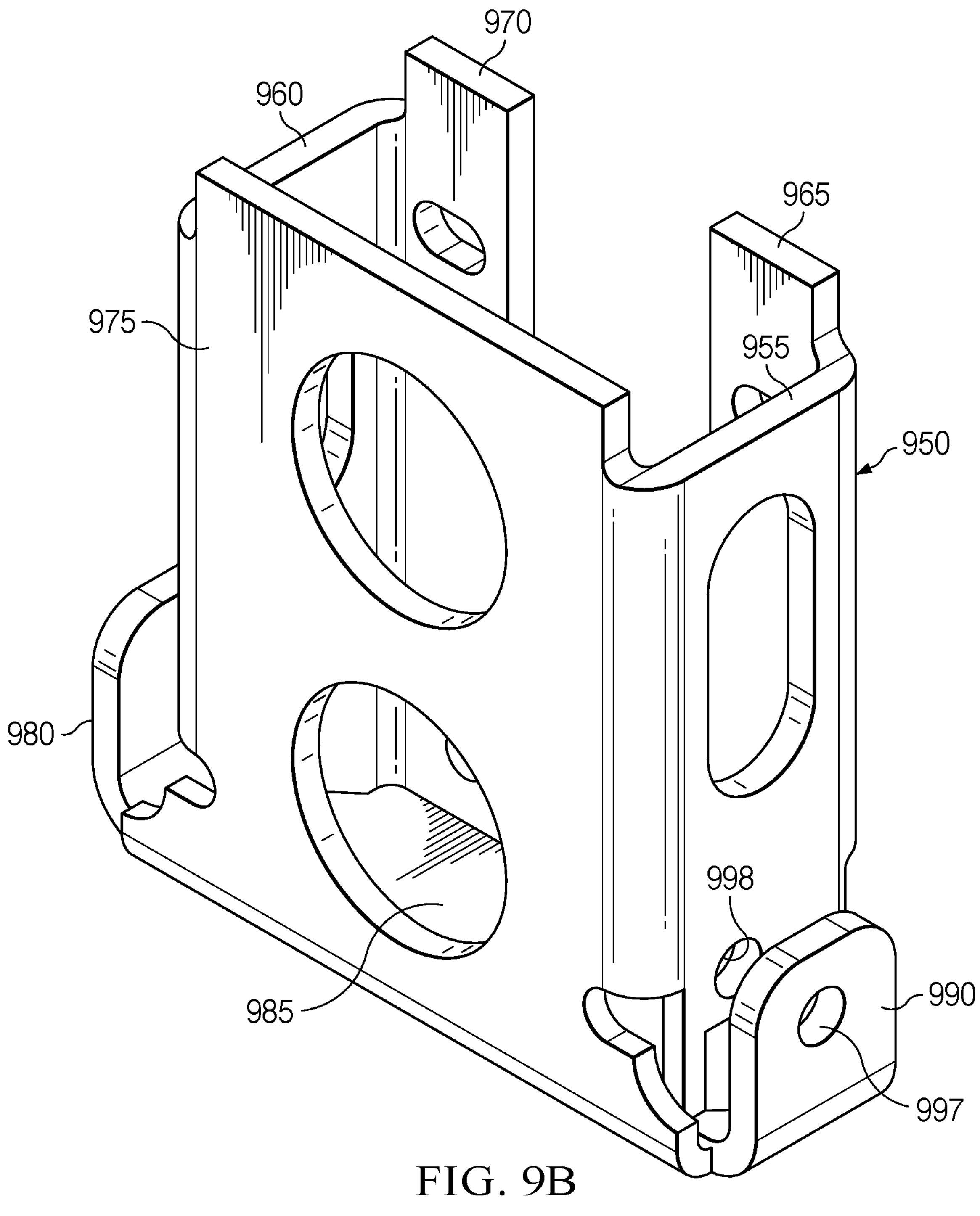
FIG. 9B is a perspective view of a lower bracket of a movable barrier, according to aspects of the present disclosure.

FIG. 9B is a perspective view of the lower bracket 950 of a movable barrier, according to aspects of the present disclosure. FIG. 9B may provide a rear view of the lower bracket 950.

FIG. 9B may provide a view of the flange 990 including a hole 997. The left wall 955 may additionally include a hole 998. The holes 997 and 998 may be aligned so as to receive the pin 230. Like the flange 980 previously described, the flange 990 may provide a space between the left wall 955 and the flange 990 into which a cable, such as the cable 235, may be positioned.

Figure 10A:
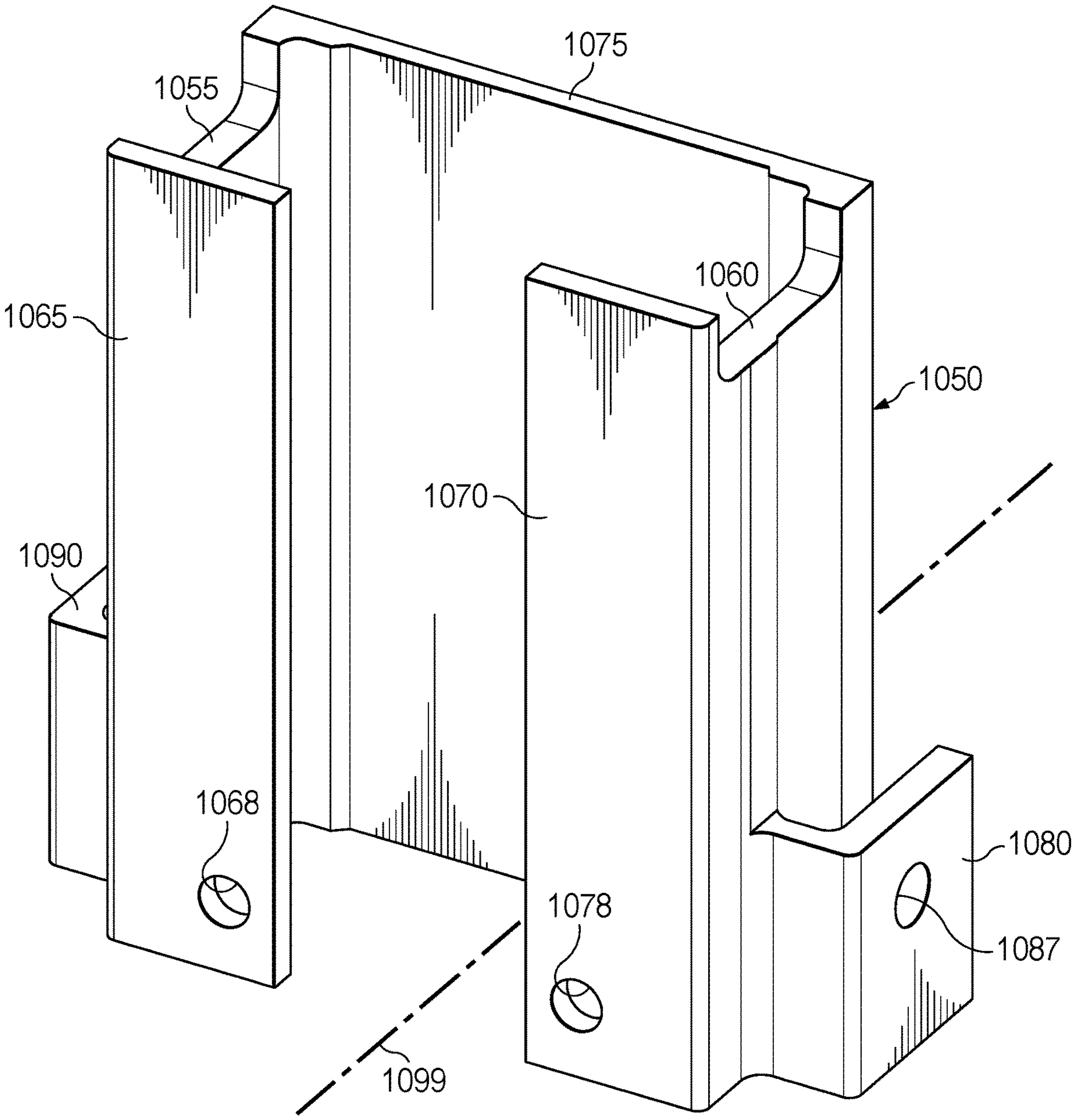
FIG. 10A is a perspective view of a lower bracket of a movable barrier, according to aspects of the present disclosure.

FIG. 10A is a perspective view of a lower bracket of a movable barrier, according to aspects of the present disclosure. FIG. 10A may provide a front view of the lower bracket 1050 described below.

Like the lower brackets described previously, the lower bracket 950 shown and described with reference to FIG. 10A may be used to affix the cable 235 to the movable barrier 190. Similarly, the lower bracket 1050 may be used to affix a left cable to a left side of the movable barrier 190 as well as a right cable to a right side of the movable barrier 190. Like the lower brackets described previously, the lower bracket 1050 may be symmetrical about a transverse axis 1099.

The lower bracket 1050 may include a rear wall 1075, a left wall 1055, a right wall 1060, a front wall 1065, and a front wall 1070. Similar to the lower brackets described previously, the lower bracket 1050 may include a flange 1080 extending from the right wall 1060. The flange 1080 may include a hole 1087. The right wall 1060 may also include a hole. The hole 1087 and the hole within the right wall 1060 may be aligned so as to receive the pin 230. The flange 1080 may provide a space between the flange 1080 and the right wall 1060. A cable, such as the cable 235 may be positioned within the space between the flange 1080 and the wall 1060. In some aspects, an opening at or near a transitional region between the front wall 1070 and the right wall 1060 may receive the lock 410. The holes 968 and 978 may receive fasteners, such as the fasteners 227 and 229 previously described. A flange 1090 may extend from the left wall 1055 and may be substantially similar to the flange 1080 but symmetrical.

Figure 10B:
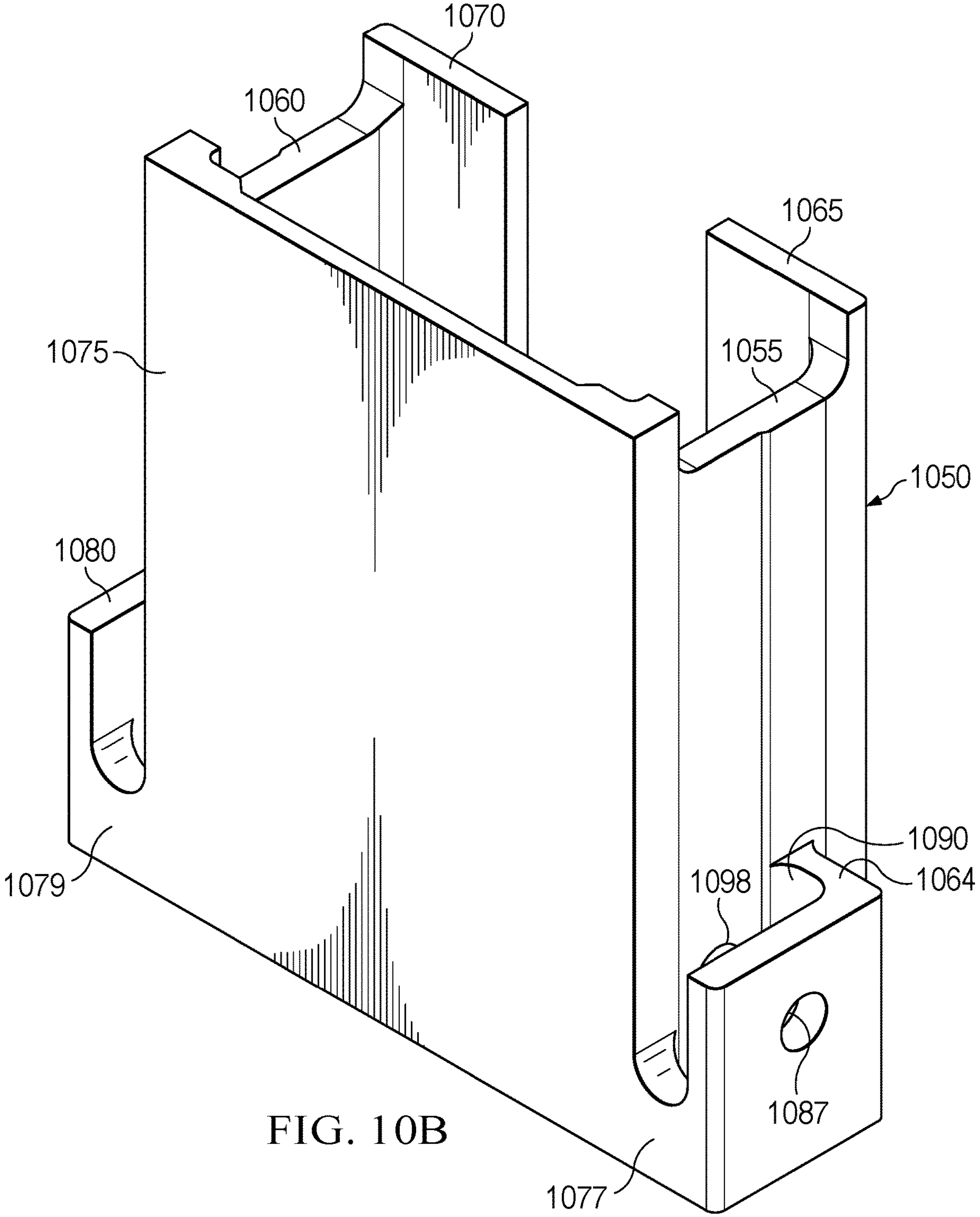
FIG. 10B is a perspective view of a lower bracket of a movable barrier, according to aspects of the present disclosure.

FIG. 10B is a perspective view of the lower bracket 1050 of a movable barrier, according to aspects of the present disclosure. FIG. 10B may provide a rear view of the lower bracket 1050.

FIG. 10B may provide a view of the flange 1090 including a hole 1097. The left wall 1055 may additionally include a hole 1098. The holes 1097 and 1098 may be aligned so as to receive the pin 230. Like the flange 1080 previously described, the flange 1090 may provide a space between the left wall 1055 and the flange 1090 into which a cable, such as the cable 235, may be positioned.

As shown in FIG. 10B, the flange 1090 may be affixed to the left wall 1055 by two extending structures. A lower structure 1077 and a connected side structure 1064 may space the flange 1090 from the left wall 1055. In some aspects, because two separate, perpendicular structures, sometimes referred to as walls, support the flange, as opposed to one, the strength of the flange 1090 is increased. In such a configuration, the strength of the lower bracket 1050 may be increased as well. The flange 1080, also shown in FIG. 10B, may similarly be supported by two structures, one of which being the lower structure 1079 shown. It is noted that in some aspects, the lower bracket 1050 may include an additional side structure opposite the structure 1064. In such a configuration, the space between the flange 1090 and the left wall 1055 may be defined by three structures creating a pocket into which the loop 237 of the cable 235 (FIG. 3) may be lowered during installation.

Figure 11A:
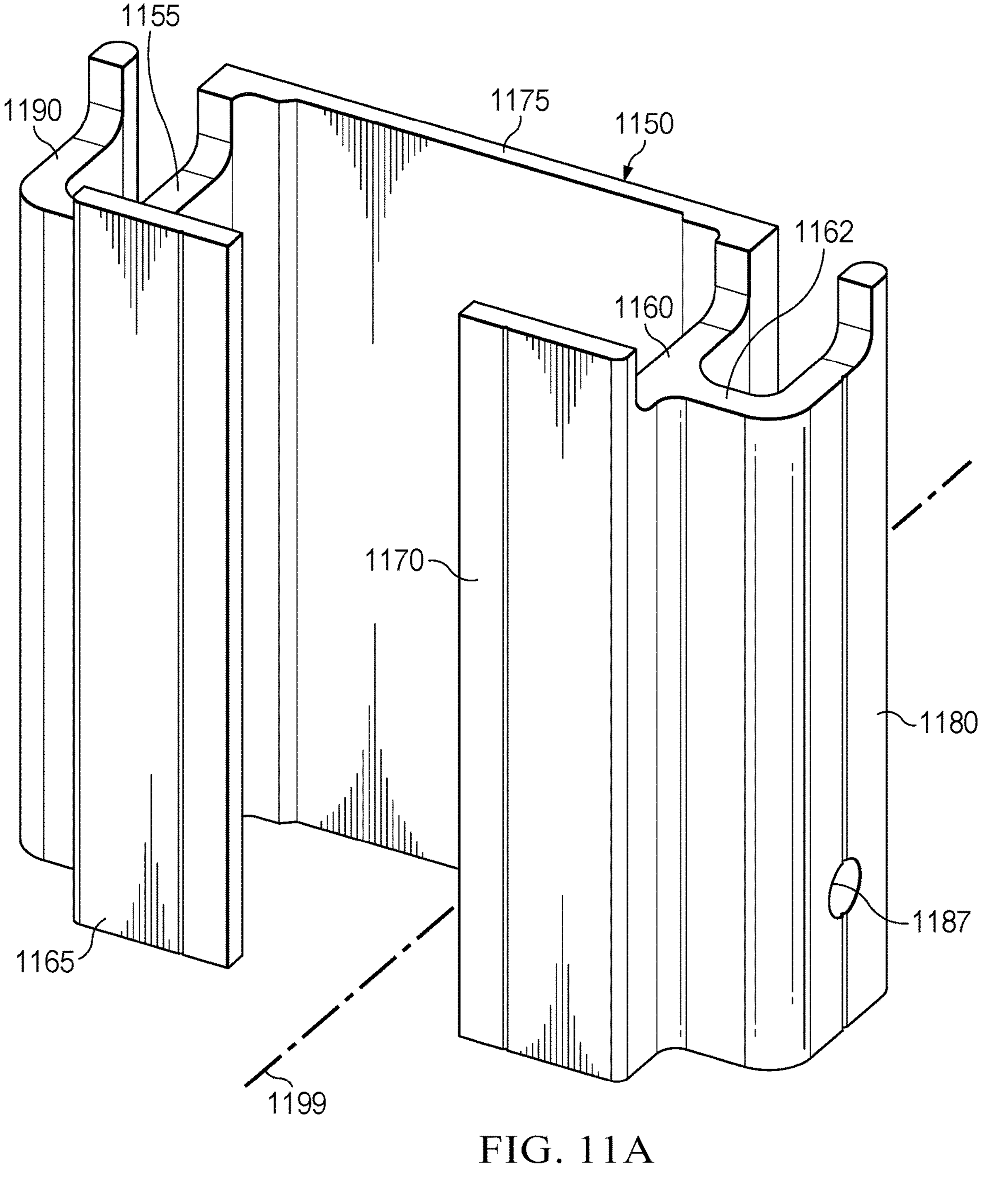
FIG. 11A is a perspective view of a lower bracket of a movable barrier, according to aspects of the present disclosure.

FIG. 11A is a perspective view of a lower bracket of a movable barrier, according to aspects of the present disclosure. FIG. 11A may provide a front view of the lower bracket 1150 described below.

Like the lower brackets described previously, the lower bracket 1150 shown and described with reference to FIG. 11A may be used to affix the cable 235 to the movable barrier 190. Similarly, the lower bracket 1150 may be used to affix a left cable to a left side of the movable barrier 190 as well as a right cable to a right side of the movable barrier 190. Like the lower brackets described previously, the lower bracket 1150 may be symmetrical about a transverse axis 1199.

The lower bracket 1150 may include a rear wall 1175, a left wall 1155, a right wall 1160, a front wall 1165, and a front wall 1170. Similar to the lower brackets described previously, the lower bracket 1150 may include a flange 1180 extending from the right wall 1160. The flange 1180 may include a hole 1187. The right wall 1160 may also include a hole. The hole 1187 and the hole within the right wall 1160 may be aligned so as to receive the pin 230. The flange 1180 may provide a space between the flange 1180 and the right wall 1160. A cable, such as the cable 235 may be positioned within the space between the flange 1180 and the wall 1160. In some aspects, an opening at or near a transitional region between the front wall 1170 and the right wall 1160 may receive the lock 410. In some aspects, the front wall 1165 and the wall 1170 may include holes configured to receive fasteners, such as the fasteners 227 and 229 previously described. A flange 1190 may extend from the left wall 1155 and may be substantially similar to the flange 1180 but symmetrical.

Figure 11B:
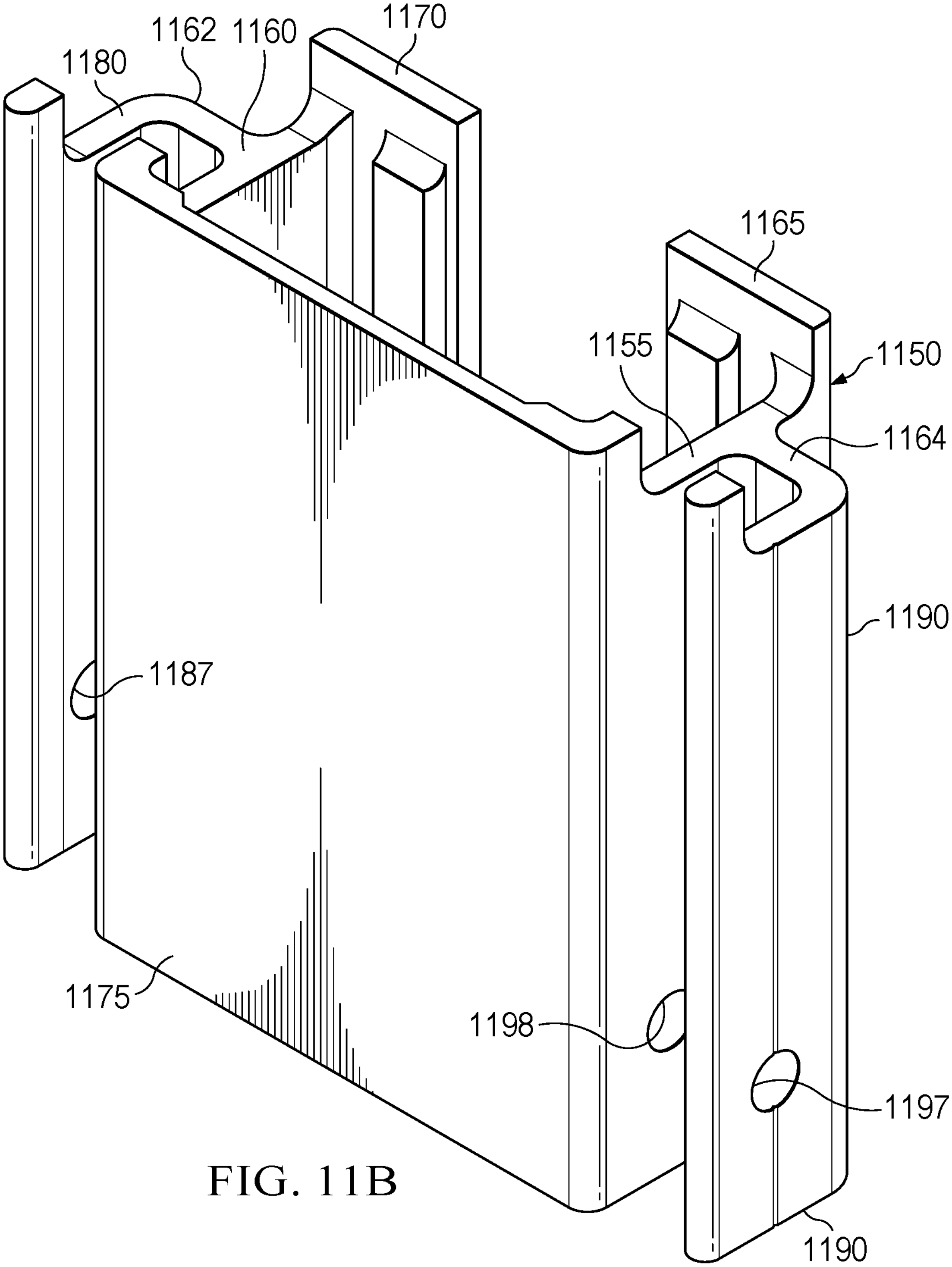
FIG. 11B is a perspective view of a lower bracket of a movable barrier, according to aspects of the present disclosure.

FIG. 11B is a perspective view of the lower bracket 1150 of a movable barrier, according to aspects of the present disclosure. FIG. 11B may provide a rear view of the lower bracket 1150.

FIG. 11B may provide a view of the flange 1190 including a hole 1197. The left wall 1155 may additionally include a hole 1198. The holes 1197 and 1198 may be aligned so as to receive the pin 230. Like the flange 1180 previously described, the flange 1190 may provide a space between the left wall 1155 and the flange 1190 into which a cable, such as the cable 235, may be positioned.

As shown in FIG. 11B, the flange 1190 may be affixed to the left wall 1155 by a vertically extending structure 1164. In some aspects, because the structure 1164 separating the flange 1190 from the wall 1155 extends from the lower region of the lower bracket 1150 to an upper region of the bracket 1150, the strength of the flange 1190 is increased. In such a configuration, the strength of the lower bracket 1150 may be increased as well. The flange 1180, also shown in FIG. 11B, may similarly be supported by a vertically extending structure. In some aspects, the flange 1190 may be additionally supported by a lower supporting structure, such as the structure 1077 shown and described with reference to FIG. 10B as well as an additional side structure positioned opposite of the structure 1164 across the space created between the flange 1190 and the left wall 1155.

Figure 12A:
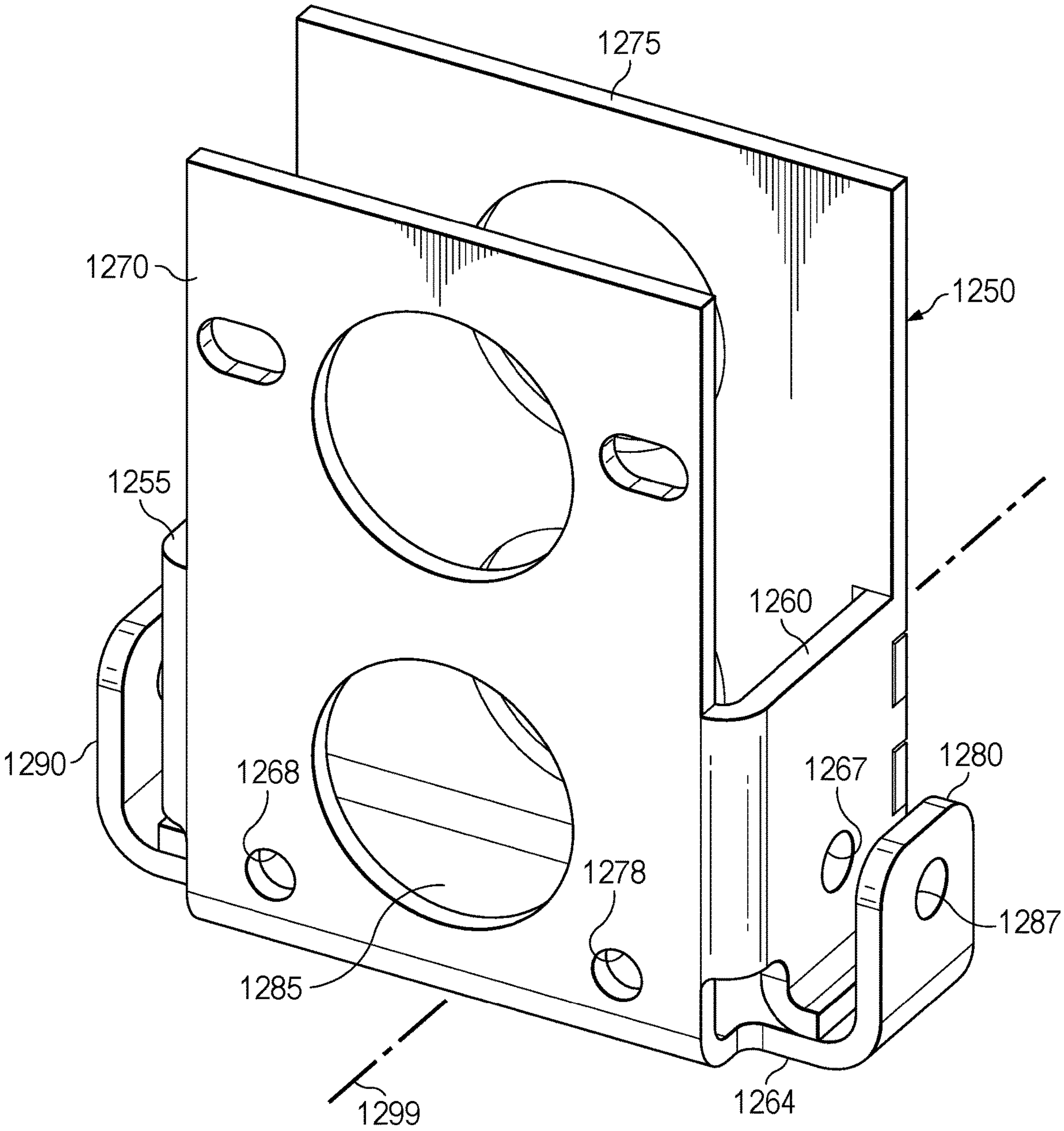
FIG. 12A is a perspective view of a lower bracket of a movable barrier, according to aspects of the present disclosure.

FIG. 12A is a perspective view of a lower bracket 1250 of a movable barrier, according to aspects of the present disclosure. FIG. 12A may provide a front view of the lower bracket 1250 described below.

Like the lower brackets described previously, the lower bracket 1250 shown and described with reference to FIG. 12A may be used to affix the cable 235 to the movable barrier 190. Similarly, the lower bracket 1250 may be used to affix a left cable to a left side of the movable barrier 190 as well as a right cable to a right side of the movable barrier 190. Like the lower brackets described previously, the lower bracket 1250 may be symmetrical about a transverse axis 1299.

The lower bracket 1250 may include a rear wall 1275, a left wall 1255, a right wall 1260, and a front wall 1270. Similar to the lower brackets described previously, the lower bracket 1250 may include a flange 1280 extending from the right wall 1260. The flange 1280 may include a hole 1287. The right wall 1260 may also include a hole 1267. The hole 1287 and the hole 1267 within the right wall 1260 may be aligned so as to receive the pin 230. The flange 1280 may provide a space between the flange 1280 and the right wall 1260. A cable, such as the cable 235 may be positioned within the space between the flange 1280 and the wall 1260. In some aspects, an opening at or near a transitional region between the front wall 1270 and the right wall 1260 may receive the lock 410. In some aspects, the front wall 1165 and the wall 1170 may include holes 1268 and 1278 configured to receive fasteners, such as the fasteners 227 and 229 previously described. As shown in FIG. 12A, the flange 1280 may be spaced from the wall 1260 by a lower supporting structure 1264.

Like the flange 1280, a flange 1290 may extend from the left wall 1255 and may be substantially similar to the flange 1280 but symmetrical. The flange 1290 may be supported by a lower supporting structure 1254. The lower bracket 1250 additionally includes a lower wall 1285. In some aspects, the lower wall 1285 may be the same unitary structure as flanges 1280 and 1290.

Figure 12B:
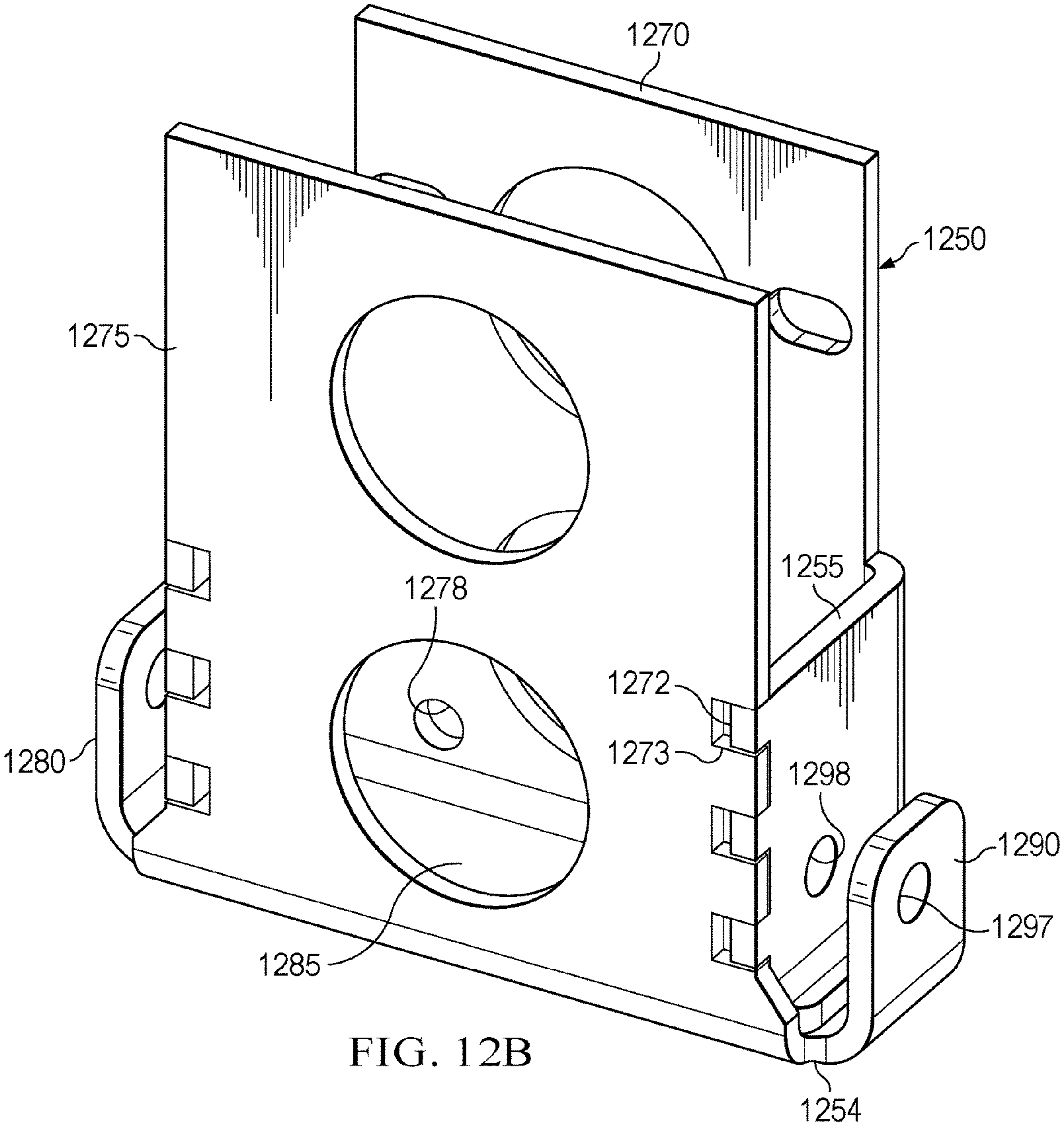
FIG. 12B is a perspective view of a lower bracket of a movable barrier, according to aspects of the present disclosure.

FIG. 12B is a perspective view of the lower bracket 1250 of a movable barrier, according to aspects of the present disclosure. FIG. 12B may provide a rear view of the lower bracket 1250.

FIG. 12B may provide a view of the flange 1290 including a hole 1297. The left wall 1255 may additionally include a hole 1298. The holes 1297 and 1298 may be aligned so as to receive the pin 230. Like the flange 1280 previously described, the flange 1290 may provide a space between the left wall 1255 and the flange 1290 into which a cable, such as the cable 235, may be positioned.

As shown in FIG. 12B, the flange 1290 may be affixed to the left wall 1255 by the horizontal lower structure 1254. In some aspects, the lower bracket 1250 may include multiple interlocking structures. For example, the rear wall 1275 may include multiple gaps 1273 within either edge of the rear wall 1275. Corresponding teeth 1272 may be positioned along one edge of the walls 1255 and 1260. The teeth 1272 may be positioned within the gaps 1273. Due to the interlocking nature of these components, the strength of the lower bracket assembly 1250 may be increased.

Figure 13:
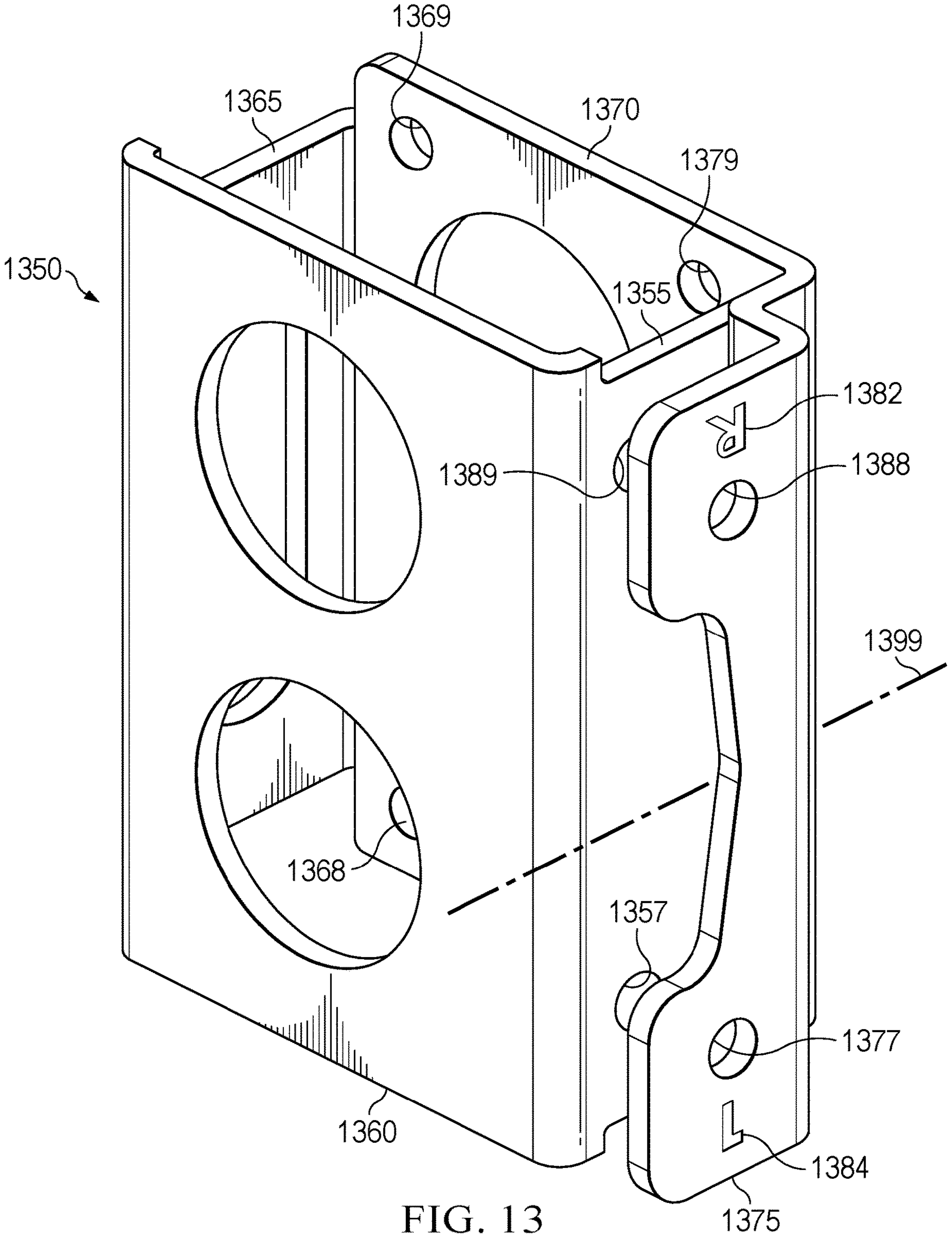
FIG. 13 is a perspective view of a lower bracket of a movable barrier, according to aspects of the present disclosure.

FIG. 13 is a perspective view of a lower bracket 1350 of a movable barrier, according to aspects of the present disclosure. The lower bracket 1350 may include a rear wall 1360, a left wall 1355, a front wall 1370, and a right wall 1365. Like the flange 275 (FIG. 4) and/or the flange 875 (FIG. 8), a flange 1375 may extend from the left wall 1355. A hole 1377 may be positioned within the flange 1375 and a hole 1357 may be positioned within the left wall 1355. The hole 1377 and the hole 1357 may be aligned to receive the pin 230. In some aspects, an opening similar to the opening 867 (FIG. 8) and/or the opening 267 (FIG. 4) may be positioned at or near the transition between the left wall 1355 and the front wall 1370. This opening may receive the lock 410. In this way, the lower bracket 1350, the pin 230, the cable 235, and lock 410 may be assembled in the same positions relative to each other and other components of the movable barrier 190 as the lower bracket 250 described with reference to FIG. 4.

In some aspects, the lower bracket 1350 may additionally include a hole 1388 also positioned within the flange 1375 and a hole 1389 positioned within the left wall 1355. Like the holes 1377 and 1357, the hole 1377 and the hole 1357 may be aligned to receive the pin 230.

The lower bracket 1350 may include multiple holes within the front wall 1370. Such holes may include holes 1368, 1378 (not pictured), 1369, and 1379. The holes 1368, 1378, 1369, and 1379 may be positioned within the front wall 1370. For example, the holes 1368 and 1378 may be positioned within a lower region of the front wall 1370 in the orientation shown in FIG. 13 and the holes 1369 and 1379 may be positioned within an upper region of the front wall 1370. In the orientation shown, the holes 1368 and 1378 may be aligned with corresponding holes within the rail 210 and the roller holder 220. For example, the holes 1368 and 1378 may be aligned with the holes 228, 226, 224, and or 222 shown and described with reference to FIG. 3 and FIG. 7. In an orientation in which the lower bracket 1350 is positioned within a right cavity of the rail 210, the holes 1369 and 1379 may align with similar corresponding holes within the rail 210.

The lower bracket 1350 may be symmetrical about the axis 1399. For example, a top half of the lower bracket 1350 may be substantially similar and mirrored to a bottom half. As a result, in the orientation shown in FIG. 13, the lower bracket 1350 may be positioned within the left cavity 211 of the lower rail 210 (FIG. 3). In this orientation, the holes 1368 and 1378 may receive the fasteners 227 and 229. However, the lower bracket 1350 may be rotated about the axis 1399 such that the holes 1388 and 1389 are positioned below the holes 1377 and 1357. In this position, the lower bracket 1350 may be received within the right cavity of the rail 210. In this orientation, holes 1369 and 1379 may then receive fasteners such as the fasteners 227 and 229 corresponding to a roller holder on the right side of the movable barrier 190.

Figure 14:
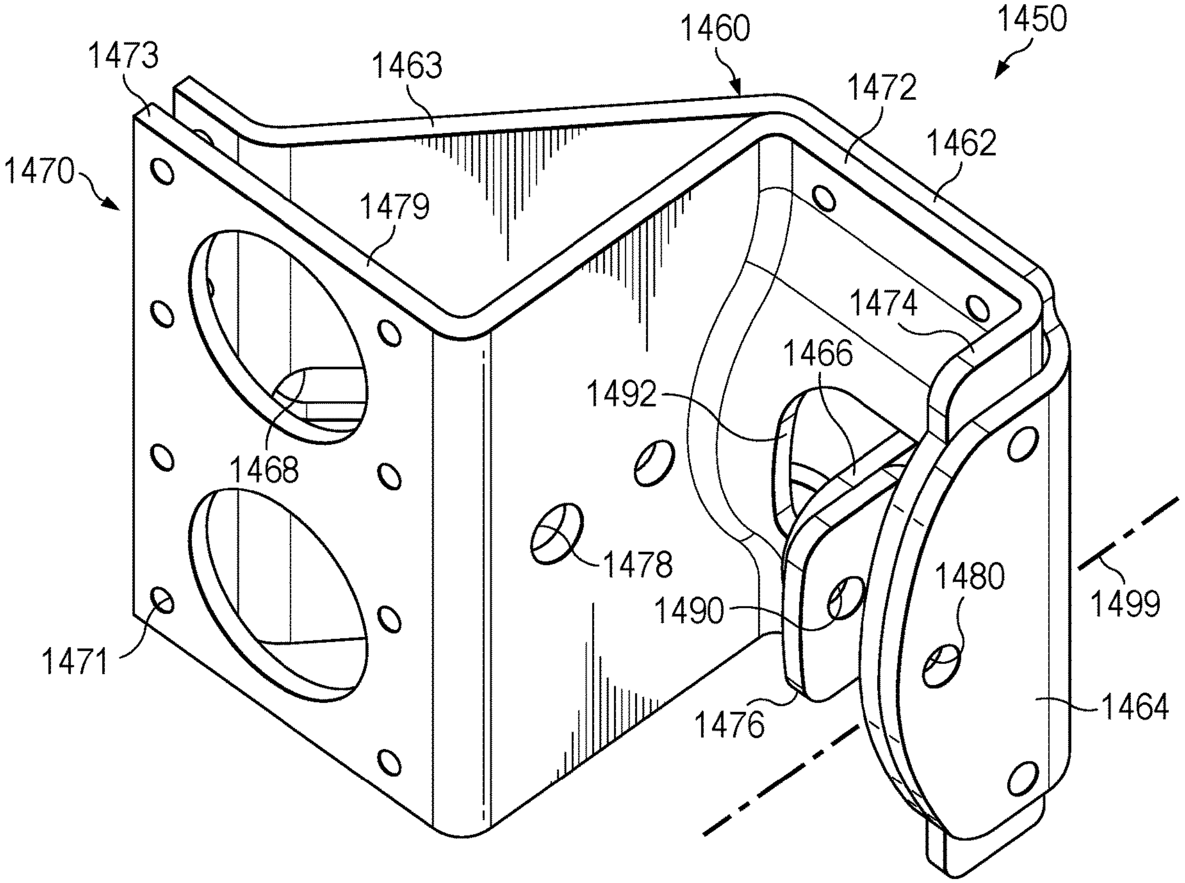
FIG. 14 is a perspective view of a lower bracket of a movable barrier, according to aspects of the present disclosure.

FIG. 14 is a perspective view of a lower bracket 1450 of a movable barrier, according to aspects of the present disclosure. The lower bracket 1450 may include an outer bracket 1460 and an inner bracket 1470. In some aspects, the inner bracket 1460 and the outer bracket 1470 may be a single unitary component or may be coupled to one another, for example, by one or more fasteners, welding, or any other way.

The outer bracket 1460 may include an end 1463 and the inner bracket 1470 may include an end 1473. In some aspects, the end 1473 may be positioned within the opening 211 of the rail 210. For example, in an installed configuration, the lower bracket 1450 may be positioned relative to the movable barrier such that the inner wall 212 of the lower rail 210 (FIG. 3) is positioned between the end 1473 and the end 1463.

The inner bracket 1470 may include a hole 1478 and the outer bracket 1460 may include a hole 1468. The holes 1478 and 1468 may be aligned to receive the stem of the roller 225 (FIG. 3).

The lower bracket 1450 may additionally include a wall 1464 and a wall 1474 forming a flange. In an installed configuration, the flange may be spaced from the leftmost portion of the movable barrier by the walls 1462 and 1472. The flange may also include a hole 1480.

An additional flange may be formed from the walls 1466 and 1476. The walls 1466 and 1476 may extend parallel the walls 1464 and 1474 and be positioned between the walls 1464 and 1474 and the movable barrier. In some aspects, the walls 1466 and 1476 may include a hole 1490. The hole 1480 and the hole 1490 may be aligned to receive the pin 230. In this way, during installation, the loop 237 of the cable 235 may be positioned between the walls 1466 and 1476 and the walls 1464 and 1474. The pin 230 may be received through the holes 1480 and 1490 as well as the loop 237. In some aspects, the loop 237 of the cable 235 may be inserted through the opening 1492.

In some aspects, the lower bracket 1450 may include a plurality of holes 1471 within the inner bracket 1470 and/or within the outer bracket 1460. The holes 1471 may be configured to receive fasteners to affix the lower bracket 1450 to the movable barrier. For example, the holes 1471 may receive the fasteners 227 and 229 (FIG. 3).

As will be described in greater detail with reference to FIG. 15 hereafter, in an installed configuration, a top surface of the lower bracket 1450 may contact the top inner surface 219 of the lower rail 210.

In some aspects, the lower bracket 1450 shown and described with reference to FIG. 14 may be referred to as a lite bracket assembly. In that regard, the lower bracket 1450 may be configured to attach a cable, such as the cable 235 (FIG. 3) to a light-weight movable barrier.

The lower bracket 1450 may be symmetrical about the axis 1499. For example, a top half of the lower bracket 1450 may be substantially similar and mirrored to a bottom half. As a result, in the orientation shown in FIG. 14, the lower bracket 1450 may be positioned within the left cavity 211 of the lower rail 210 (FIG. 3). In this orientation, a subset of the holes 1471 may receive the fasteners 227 and 229. The lower bracket 1450 may be rotated about the axis 1499. In this position, the lower bracket 1450 may be received within the right cavity of the rail 210.

Figure 15:
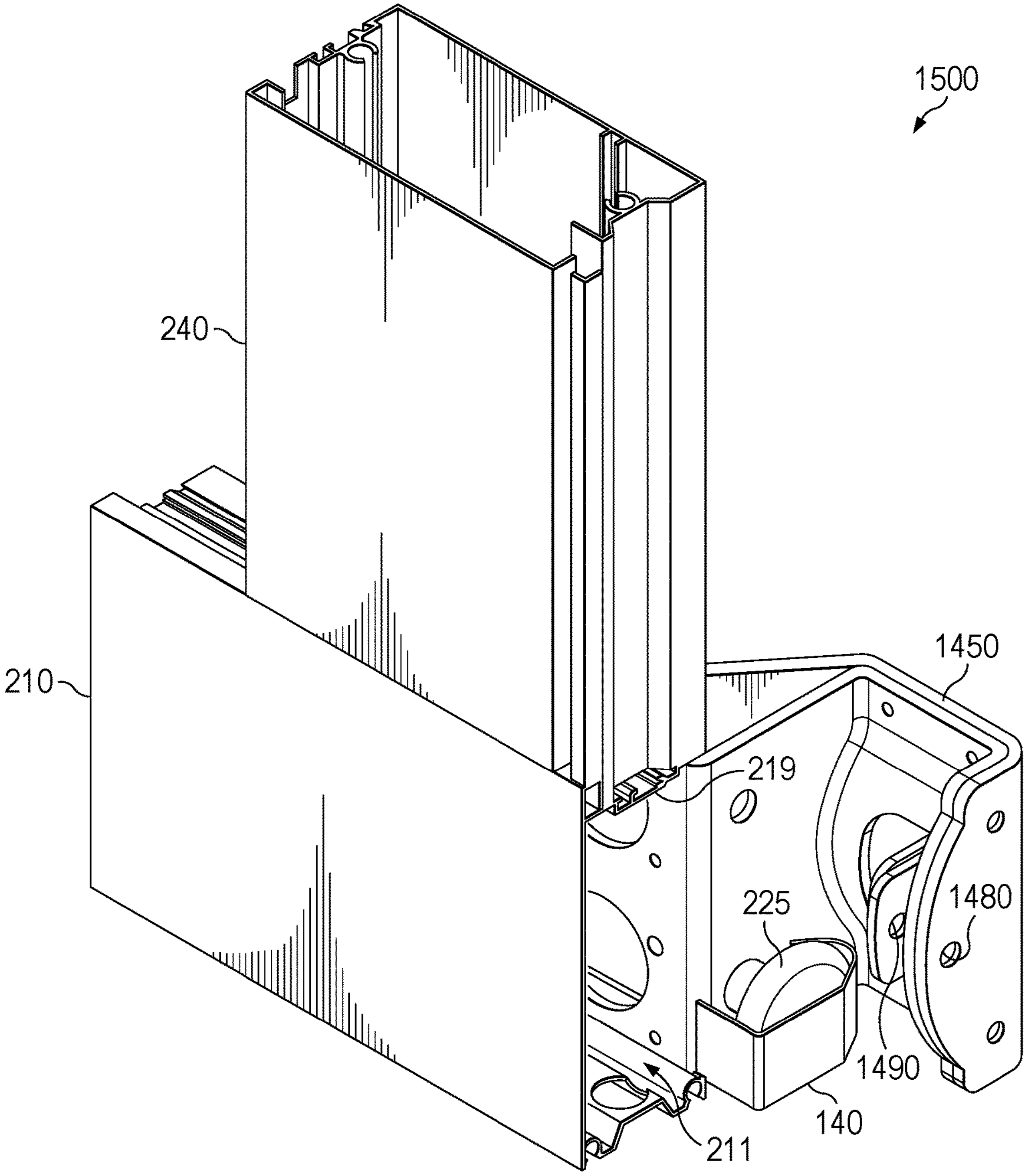
FIG. 15 is a perspective view of a lower bracket assembly of the movable barrier 190, according to aspects of the present disclosure.

FIG. 15 is a perspective view of a lower bracket assembly 1500 of the movable barrier 190, according to aspects of the present disclosure. The movable barrier 190 may include various components. Like the lower bracket assembly 200 shown and described with reference to FIG. 2, the lower bracket assembly 1500 may be positioned at a lower region of the movable barrier 190. For example, the movable barrier 190 may include two lower bracket assemblies 1500. The lower bracket assembly 1500 shown in FIG. 15 may correspond to a left lower bracket assembly 1500. The left lower bracket assembly 1500 may include or engage with a left side of the rail 210. Similarly, a right lower bracket assembly may be positioned next to or affixed to a right side of the rail 210.

The lower bracket assembly 1500 shown in FIG. 15 includes the lower bracket 1450, the roller 225, the track 140, the lower rail 210 and the stile 240. As described with reference to FIG. 14, a pin may be positioned within the holes 1480 and 1490 and within the loop 237 of the cable 235. The barrier 190 may be moved between an open position and a closed position by moving the cable in an upward and downward direction, as explained with reference to FIGS. 1 and 2.

Like the lower bracket assembly 200 described previously, the lower bracket assembly 1500 may provide additional strength to the connection between the cable 235 to the lower region of the movable barrier 190 (e.g., the lower rail 210 shown). In the implementation of the lower bracket assembly 1500 shown in FIG. 15, the upward acting force provided by the barrier operator 95 on the cable 235 is transferred to the movable barrier 190 within the lower rail 210 because the lower bracket 1450 is positioned within the lower rail 210. For example, the top surface 1479 of the lower bracket 1450 may contact or mate with an inner surface of the cavity defined by the lower rail 210, such as the surface 219. In this way, as the cable 235 is moved upward this force is transferred through the pin 230 to the bracket 1450 and to the rail 210 due to the relative positions of each of these components. In this way, no fasteners bear the weight of the movable barrier 190 alone. Rather, the weight of the barrier 190 as it is moved from a closed position to an open position is supported within the rail 210 of the barrier 190 itself.

In the example shown in FIG. 15, the roller 225 may be positioned within the track 140. In some aspects, the lower bracket 1450 may advantageously require fewer parts than the lower brackets previously described. For example, because the lower bracket 1450 receives the roller 225, the roller holder bracket 220 (FIG. 3) is not needed. This reduction in required components in turn decreases the cost and complexity of manufacturing, servicing, and inventory of the lower bracket assembly 1500.

Figure 16:
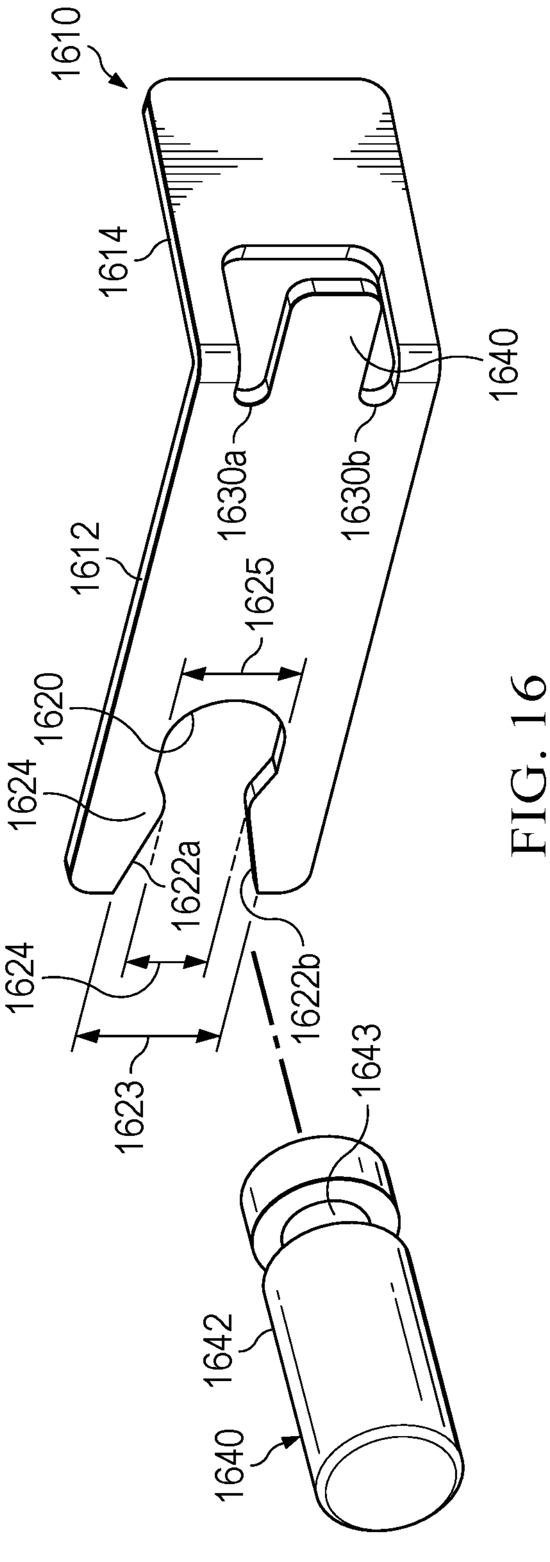
FIG. 16 is a perspective view of a pin and a corresponding lock, according to aspects of the present disclosure.

FIG. 16 is a perspective view of a pin 1640 and a corresponding lock 1610, according to aspects of the present disclosure. In some aspects, the lock 1610 may be used in the same way as either of the lock 410 or the lock 610. For example, the lock 1610 may be positioned in the same positions relative to the pin 230 and the lower bracket 250 as previously described, and/or the pin 1640 shown and/or any other lower brackets described herein.

As shown in FIG. 16, the lock 1610 may include a main body 1612 and a tab 1614. The main body 1612 may include a slot 1620. The slot 1620 may form an opening at a distal end of the main body 1612. The opening may be configured to receive the annular groove 233 of the pin 230 and/or the slot 1643 of the pin 1640. The slot 1620 may include two angled surfaces 1622*a* and 1622*b* defining a distal region of the slot 1620. At a distal edge of the main body 1612, the angled surfaces 1622*a* and 1622*b* may define a width 1623. The angled surfaces 1622*a* and 1622*b* may approach each other in a proximal direction along the body 1612 of the lock 1610 to a region of minimum width 1624. A region of larger width 1625 may be positioned proximal to this point.

In some aspects, the width 1623 may correspond to the diameter of the shaft 232 of the pin 230 and/or the shaft 1642 of the pin 1640. The width 1624 may correspond to the diameter of the annular groove 233 of the pin 230 and/or the annular groove 1643 of the pin 1640.

In some aspects, because the width 1625 is greater than the width 1624, an installer of a bracket assembly including the lock 1610 may feel when the point of the lock 1610 corresponding to the width 1624 has slid past the annular groove 1643 of the pin 1640. In this way, the installer may be confident that the lock 1610 is fully inserted and the distal end of the pin is positioned within the region of the slot 1620 corresponding to the width 1625.

In some aspects, the lock 1610 may include an additional handle 1640. The handle 1640 may be used by an assembler of the movable barrier system 100 during assembly or disassembly. For example, the assembler may grasp the handle 1640 to position the lock 1610 within the lower bracket to secure the pin 230 and/or 1640. The lock 1610 may additionally include notches 1630*a* and 1630*b* aligning with the slot 1620 similar to the notches 630*a* and 630*b* of the lock 1610.

In some aspects, the lock 1610 may include any of the features of the lock 410 shown and described with reference to FIGS. 5A-5D, including the notches 430. In this way, the lock 1610 may be positioned within the bracket 250 and aligned with various surfaces of the bracket and then the pin 230 and/or 1640 may be inserted or vice versa as described.

In some aspects, the pin 1640 may differ from the pin 230 in various ways. For example, the pin 1640 may be used in place of the pin 230 in any of the assemblies described herein. In some aspects, the pin 1640 may not include a head. As previously explained, even without a head, the pin 1640 may be secured in position by any of the locks 410, 610, or 1610.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A bracket system for securing a lift cable of a movable barrier, comprising:
- a pin; and
- a bracket comprising:
  - a first wall including a first hole;
  - a first flange including a second wall spaced from the first wall, the second wall including a second hole, the first hole and the second hole being aligned and configured to receive the pin; and
  - a first transverse wall transverse to the first wall, wherein the first wall, the first transverse wall, or both, define an opening in the bracket; and
- a retainer extendable through the opening in the bracket to secure the pin to the bracket.

2. The bracket system of claim 1, wherein the first flange protrudes from the first wall.

3. The bracket system of claim 1, wherein the first hole and the second hole are coaxially aligned.

4. The bracket system of claim 1, further comprising:
- a rail of the movable barrier; and
- a fastener configured to couple the first transverse wall of the bracket to an inner surface of a cavity of the rail.

5. The bracket system of claim 1, further comprising a rail of the movable barrier, wherein the bracket further comprises:

a third wall including a third hole, and a fourth wall including a fourth hole, and wherein the rail comprises:

a first cavity corresponding to a first end of the rail and when the bracket is positioned within the first cavity corresponding to the first end of the rail, the first hole and second hole are configured to receive the pin, and a second cavity corresponding to a second opposite end of the rail and when the bracket is positioned within the second cavity, the third hole and the fourth hole are configured to receive the pin.

6. The bracket system of claim 5, wherein an upper profile of the first wall of the bracket and an upper profile of the third wall of the bracket aligns with a profile of the first cavity of the first end of the rail and the second cavity of the second opposite end of the rail.

7. The bracket system of claim 5, wherein a lower profile of the first wall of the bracket and a lower profile of the third wall of the bracket aligns with a profile of the first cavity of the first end of the rail and the second cavity of the second opposite end of the rail.

8. The bracket system of claim 5, further comprising a second transverse wall transverse to the first wall and the third wall and being coupled to both the first wall and third wall.

9. The bracket system of claim 1, further comprising a rail of the movable barrier, wherein the bracket is positioned within a cavity of the rail such that the bracket supports loads applied on the bracket in an upward direction.

10. A bracket system comprising:

a rail of a movable barrier, the rail defining a first inner cavity at a first end of the rail and a second inner cavity at a second end of the rail;

a bracket comprising:

a first wall comprising a first hole; and a first flange extending from the first wall of the bracket, the first flange comprising a second wall having a second hole, wherein the first hole and the second hole are aligned and spaced by a separation; and a pin configured to span the separation and attach to a first cable, wherein the bracket is configured to be positioned within the first inner cavity of the first end of the rail in a first configuration and configured to be positioned within the second inner cavity of the second end of the rail in a second configuration, and wherein the first wall of the bracket further comprises a third hole and the first flange further comprises a fourth hole, the third hole and the fourth hole being aligned and configured to receive the pin when the bracket is in the second configuration.

11. The bracket system of claim 10, wherein the first inner cavity is defined at least by a first rear inner surface and a first front inner surface, wherein the second inner cavity is defined at least by a second rear inner surface and a second front inner surface, and wherein the bracket further comprises a first transverse wall and a second transverse wall such that:

when the bracket is positioned within the first inner cavity, the second transverse wall of the bracket contacts the first rear inner surface of the rail and the first transverse wall of the bracket contacts the first front inner surface of the rail; and when the bracket is positioned within the second inner cavity, the first transverse wall of the bracket contacts the second rear inner surface of the rail and the second transverse wall of the bracket contacts the second front inner surface of the rail.

12. The bracket system of claim 11, wherein, when the bracket is positioned within the first inner cavity, the first hole and the second hole are configured to receive the pin, and wherein, when the bracket is positioned within the second inner cavity, the first hole and the second hole are configured to receive a second pin, the second pin couplable to a second cable attachable to the movable barrier.

13. The bracket system of claim 11, wherein the bracket further comprises a first fastener hole within the first transverse wall, the first fastener hole configured to receive a first fastener when the bracket is positioned within the first inner cavity of the rail and wherein the bracket further comprises a second fastener hole within the second transverse wall, the second fastener hole configured to receive a second fastener when the bracket is positioned within the second inner cavity of the rail.

14. The bracket system of claim 10, wherein the pin is oriented horizontally and parallel to the rail.

15. A bracket system for a movable barrier, the bracket system comprising:

a pin; and a bracket comprising:

a first wall including a first hole;

a first transverse wall including a fastener hole, the fastener hole configured to receive a fastener;

a first flange protruding from the first wall, the first flange including a second wall having a second hole, the first hole and the second hole configured to receive the pin;

a third wall including a third hole, the third wall positioned opposite the first wall; and a second flange protruding from the third wall, the second flange including a fourth hole, the third hole and the fourth hole configured to receive the pin.

16. The bracket system of claim 15, wherein the fastener hole is transverse to the first hole and the second hole.

17. A bracket system for securing a lift cable to a movable barrier, the bracket system comprising:

a bottom rail of a movable barrier, the bottom rail having an inner surface within an end opening;

a bracket comprising:

a first wall;

a first transverse wall extending transverse to the first wall and sized to fit within the end opening of the bottom rail; and an anchor system shaped to project from the end opening of the bottom rail when the bracket is within the end opening of the bottom rail; and a retainer coupled to the bracket and configured to secure a pin to the bracket, wherein at least a portion of the retainer is positioned between the bracket and the inner surface of the bottom rail such that the inner surface of the bottom rail prevents the retainer from decoupling from the bracket.

18. The bracket system of claim 17, wherein the first transverse wall comprises holes usable to secure the first transverse wall to the bottom rail.

19. The bracket system of claim 17, wherein the anchor system comprises a flange and a pin securable to the flange.

20. The bracket system of claim 19, wherein the flange comprises a second wall spaced from the first wall by a separation to receive the lift cable therebetween.

* * * * *